United States Patent
Xu et al.

(10) Patent No.: US 12,414,065 B2
(45) Date of Patent: Sep. 9, 2025

(54) COMMUNICATION METHOD AND APPARATUS

(71) Applicant: Huawei Technologies Co., Ltd., Shenzhen (CN)

(72) Inventors: Xiaoying Xu, Shenzhen (CN); Qiang Fan, Shanghai (CN); Feng Han, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 152 days.

(21) Appl. No.: 18/303,758

(22) Filed: Apr. 20, 2023

(65) Prior Publication Data
US 2023/0262629 A1 Aug. 17, 2023

Related U.S. Application Data

(63) Continuation of application No. PCT/CN2020/122532, filed on Oct. 21, 2020.

(51) Int. Cl.
*H04W 56/00* (2009.01)
*H04L 43/0864* (2022.01)

(52) U.S. Cl.
CPC ....... *H04W 56/004* (2013.01); *H04L 43/0864* (2013.01); *H04W 56/0065* (2013.01)

(58) Field of Classification Search
CPC ............ H04L 43/0864; H04W 56/004; H04W 56/005; H04W 56/0055; H04W 56/0065; Y02D 30/70
See application file for complete search history.

(56) References Cited

U.S. PATENT DOCUMENTS

| 2004/0165543 A1* | 8/2004 | Nakazawa | H04L 47/283 370/335 |
| 2007/0115842 A1* | 5/2007 | Matsuda | H04W 56/006 370/252 |

(Continued)

FOREIGN PATENT DOCUMENTS

| CN | 106658696 A | 5/2017 |
| CN | 110662283 A | 1/2020 |

(Continued)

OTHER PUBLICATIONS

Catt, "Summary of Offline Discussion on CB: # 1006_Email_SON MDT_PRACHConfig", 3GPP TSG-RAN WG3 #107bis-e; R3-202467, Online meeting, Apr. 20-30, 2020, XP051880674, 14 pages.

(Continued)

*Primary Examiner* — Stephen J Clawson
(74) *Attorney, Agent, or Firm* — Slater Matsil, LLP

(57) ABSTRACT

A communication method and apparatus are provided. The method includes: receiving a first time difference from a second communication apparatus; determining a round trip time RTT based on the first time difference and a second time difference; and sending a second message to a terminal device, where the second message includes the RTT, an air interface propagation delay, or terminal device side timing information, a value of the air interface propagation delay is equal to half of a value of the RTT, and the terminal device side timing information is determined based on the air interface propagation delay. According to the method and the apparatus in embodiments of this application, high-precision timing between a network device and the terminal device in a CU-DU separation architecture can be implemented.

20 Claims, 13 Drawing Sheets

(56) References Cited

U.S. PATENT DOCUMENTS

| | | | |
|---|---|---|---|
| 2014/0105192 A1* | 4/2014 | Park | H04L 5/0078 |
| | | | 370/336 |
| 2014/0177653 A1* | 6/2014 | Tzeng | H04J 3/0635 |
| | | | 370/503 |
| 2019/0097744 A1* | 3/2019 | Abdullah | H04J 3/0673 |
| 2019/0159147 A1* | 5/2019 | Ryu | H04W 72/0446 |
| 2019/0246310 A1* | 8/2019 | Han | H04W 28/04 |
| 2020/0084808 A1* | 3/2020 | Oak | H04L 69/321 |
| 2020/0145873 A1* | 5/2020 | Park | H04L 47/11 |
| 2020/0236507 A1* | 7/2020 | Manolakos | H04W 4/025 |
| 2022/0104057 A1* | 3/2022 | Abedini | H04W 28/16 |
| 2023/0370994 A1* | 11/2023 | Yang | H04L 5/0094 |
| 2024/0251374 A1* | 7/2024 | Wei | G01S 5/10 |
| 2024/0357530 A1* | 10/2024 | Liang | H04W 56/0045 |

FOREIGN PATENT DOCUMENTS

| | | |
|---|---|---|
| CN | 111417186 A | 7/2020 |
| WO | 2019193154 A1 | 10/2019 |

OTHER PUBLICATIONS

3GPP TSG-RAN WG2 #105bis Tdoc, R2-1904041, SIB and RRC-unicast delivery in reference time provisioning, Ericsson, Xi'an, China, Apr. 8-Apr. 12, 2019, total 8 pages.

Intel Corporation, "QoS monitoring support for URLLC", R3-201094 3GPP TSG-RAN WG3 Meeting #107-e Electronic Meeting, Feb. 24-Mar. 6, 2020, Feb. 14, 2020, 6 pages.

3GPP TS 23.501 V16.3.0 (Dec. 2019), "3rd Generation Partnership Project; Technical Specification Group Services and System Aspects System architecture for the 5G System (5GS)", Stage 2 (Release 16), 417 pages.

3GPP TS 38.104 V16.5.0, "3rd Generation Partnership Project; Technical Specification Group Radio Access Network; NR; Base Station (BS) radio transmission and reception (Release 16)", Sep. 2020, 278 pages.

3GPP TS 38.215 V16.3.0, "3rd Generation Partnership Project; Technical Specification Group Radio Access Network; NR; Physical layer measurements (Release 16)", Sep. 2020, 25 pages.

3GPP TS 38.300 V15.4.0 (Dec. 2018), "3rd Generation Partnership Project; Technical Specification Group Radio Access Network NR" NR and NG-RAN Overall Description, Stage 2 (Release 15), 97 pages.

3GPP TS 38.331 v16.2.0, 3rd Generation Partnership Project; Technical Specification Group Radio Access Network; NR; Radio Resource Control (RRC) protocol specification (Release 16), Sep. 2020, 921 pages.

3GPP TS 38.413 V16.0.0 (Dec. 2019), "3rd Generation Partnership Project; Technical Specification Group Radio Access Network" NG-RAN; NG Application Protocol (NGAP)(Release 16), 335 pages.

3GPP TS 38.423 V16.0.0 (Dec. 2019), "3rd Generation Partnership Project; Technical Specification Group Radio Access Network" NG-RAN, Xn application protocol (XnAP)(Release 16), 330 pages.

3GPP TS 38.463 V15.8.0, "3rd Generation Partnership Project; Technical Specification Group Radio Access Network; NG-RAN" E1 Application Protocol (E1AP)(Release 15), Sep. 2020, 179 pages.

3GPP TS 38.473 V15.4.1, "3rd Generation Partnership Project; Technical Specification Group Radio Access Network; NG-RAN", F1 application protocol (F1AP)(Release 15), Jan. 2009, 192 pages.

* cited by examiner

COMMUNICATION METHOD AND APPARATUS

CROSS-REFERENCE TO RELATED APPLICATIONS

This application is a continuation of International Application No. PCT/CN2020/122532, filed on Oct. 21, 2020, the disclosure of which is hereby incorporated by reference in its entirety.

TECHNICAL FIELD

This application relates to the field of communication technologies, and in particular, to a communication method and apparatus.

BACKGROUND

As the main driving forces of future communication development, the mobile Internet and the Internet of Things have had a great impact on people's living, work, leisure, and transportation. Currently, to implement precise control of a service, in a plurality of fields such as industrial control, smart grid, and unmanned driving, a high-precision time synchronization requirement is required for clocks on a terminal device and a wireless network side, and time synchronization precision reaches a microsecond level or even a nanosecond level.

Currently, in a long term evolution (LTE) communication system and a 5th generation (5G) communication system (or referred to as new radio (NR)), a base station sends high-precision time information to a terminal device in a broadcast or unicast manner, to implement high-precision timing. Because there is a propagation delay between the base station and the terminal device, a high-precision time on a terminal device side is actually a result of adding a high-precision time on a base station side to an air interface propagation delay. In a design, a round trip time (RTT) may be determined by using a time difference between downlink receiving and uplink sending of the terminal device and a time difference between uplink receiving and downlink sending of the base station, to determine the air interface propagation delay, where the air interface propagation delay is equal to half of the RTT.

In the 5G communication system, the base station may use an architecture (referred to as a CU-DU separation architecture below) in which a central unit (CU) and a distributed unit (DU) are separated. In the CU-DU separation architecture, how to determine the air interface propagation delay by using the time difference between downlink receiving and uplink sending of the terminal device and the time difference between uplink receiving and downlink sending of the base station, and further implement high-precision timing between a network device and the terminal device is a technical problem to be resolved in embodiments of this application.

SUMMARY

This application provides a communication method and apparatus, to implement high-precision timing between a network device and a terminal device in a CU-DU separation architecture.

It should be noted that, in the following description, a first communication apparatus is a DU or a chip in the DU, a second communication apparatus is a CU or a chip in the CU, and the terminal device may further be a chip in the terminal device. The following solution is described by using an example in which the first communication apparatus is a DU, the second communication apparatus is a CU, and the terminal device is UE.

According to a first aspect, a communication method is provided. The method includes: A DU receives a first time difference from a CU. The first time difference is a time difference between receiving a first downlink time unit and sending a first uplink time unit by UE. The DU determines a round trip time RTT based on the first time difference and a second time difference. The second time difference is a time difference between receiving the first uplink time unit and sending the first downlink time unit by the DU. The DU sends a second message to the UE. The second message includes the RTT, an air interface propagation delay, or UE side timing information, a value of the air interface propagation delay is equal to half of a value of the RTT, and the UE side timing information is determined based on the air interface propagation delay.

According to the foregoing method, the DU may obtain the first time difference on a UE side from the CU, and determine the air interface propagation delay or the UE side timing information based on the first time difference and the second time difference on a DU side, to implement high-precision timing between the terminal device and the network device in the CU-DU separation architecture. Further, if the DU compensates for DU side timing information based on the air interface propagation delay, the UE side timing information is obtained. In addition, the UE side timing information is directly sent to the UE by using the foregoing second message. In this way, the DU directly sends the compensated timing information (that is, the UE side timing information) to the UE, and the UE does not need to perform calculation by itself again, thereby reducing power consumption of the UE. In addition, the DU does not need to separately send network side timing information to the UE, thereby reducing signaling overheads.

Optionally, before the DU receives the first time difference from the CU, the method further includes: The DU sends a first message to the CU, where the first message is used to request the first time difference; or the DU sends second indication information to the UE, where the second indication information indicates the UE to report the first time difference.

In a possible design, that the first message is used to request the first time difference specifically includes: the first message is used to request the CU to send the first time difference to the DU when receiving the first message; or the first message includes a first periodicity, where the first periodicity is a periodicity in which the CU sends the first time difference to the DU. Optionally, the first message may further include indication information indicating the CU to stop periodically sending the first time difference to the DU.

According to the foregoing method, the CU may determine a difference between a current first time difference and a first time difference sent last time. If the difference is greater than a predefined threshold, the CU may no longer send the first time difference to the DU. In this way, the DU can be prevented from frequently sending the first time difference to the CU, thereby reducing signaling overheads.

According to a second aspect, a communication method is provided. The method includes: A CU receives a first time difference from UE. The first time difference is a time difference between receiving a first downlink time unit and sending a first uplink time unit by the UE. The CU sends the first time difference to a DU. The first time difference is used by the DU to determine a second message, the second message includes a round trip time RTT, an air interface propagation delay, or UE side timing information, a value of the air interface propagation delay is equal to half of a value of the RTT, and the UE side timing information is determined based on the air interface propagation delay.

According to the foregoing method, the CU may obtain the first time difference of the UE, and send the foregoing first time difference to the DU. Finally, the DU determines the air interface propagation delay, or directly compensates for DU side timing information by using the air interface propagation delay, thereby implementing high-precision timing between the network device and the terminal device in a CU-DU architecture.

Optionally, before the CU receives the first time difference from the UE, the method further includes: The CU sends first indication information to the UE. The first indication information indicates the UE to report the first time difference.

In a possible design, the first indication information includes a periodicity in which the UE reports the first time difference to the CU; or a trigger event for which the UE reports the first time difference to the CU.

Optionally, the first indication information further includes information about a cell corresponding to the first time difference reported by the UE.

It should be indicated that if the first indication information does not include the information about the cell, the UE may report the first time difference of a predefined cell to the CU. The predefined cell may be a primary cell, a primary secondary cell, a secondary cell, or the like.

In a possible design, the trigger event includes at least one of the following: a variation between a first time difference currently measured by the UE and a first time difference reported last time is greater than or equal to a first threshold; and the first time difference currently measured by the UE is greater than or equal to a second threshold.

According to the foregoing method, the UE can be prevented from frequently reporting the first time difference to the CU, thereby reducing signaling overheads.

Optionally, the method further includes: The CU receives, from the UE, the information about the cell corresponding to the first time difference.

Optionally, before the first time difference is sent to a DU, the method further includes: The CU receives a first message from the DU. The first message is used to request the first time difference.

In a possible design, that the first message is used to request the first time difference specifically includes: the first message is used to request the CU to send the first time difference to the DU when receiving the first message; or the first message includes a first periodicity, where the first periodicity is a periodicity in which the CU sends the first time difference to the DU.

According to a third aspect, a communication method is provided, including: UE sends a first time difference to a CU. The first time difference is a time difference between receiving a first downlink time unit and sending a first uplink time unit by the UE. The UE receives a second message from a DU. The second message includes a round trip time RTT, an air interface propagation delay, or UE side timing information, a value of the air interface propagation delay is equal to half of a value of the RTT, and the UE side timing information is determined based on the air interface propagation delay.

According to the foregoing method, if the DU directly sends the UE side timing information to the UE, the UE does not need to calculate the UE side timing information by itself, thereby reducing power consumption of the UE.

Optionally, before the UE sends the first time difference to the CU, the method further includes: The UE receives first indication information from the CU, where the first indication information indicates the UE to report the first time difference; or the UE receives second indication information from the DU, where the second indication information indicates the UE to report the first time difference.

According to a fourth aspect, a communication method is provided. The method includes: A CU receives a first time difference from UE. The first time difference is a time difference between receiving a first downlink time unit and sending a first uplink time unit by the UE. The CU receives a second time difference from a DU. The second time difference is a time difference between receiving the first uplink time unit and sending the first downlink time unit by the DU. The CU determines a round trip time RTT based on the first time difference and the second time difference. The CU sends a fourth message to the UE. The fourth message includes the RTT, an air interface propagation delay, or UE side timing information, the UE side timing information is determined based on the air interface propagation delay, and a value of the air interface propagation delay is equal to half of a value of the RTT.

According to the foregoing method, the CU obtains the first time difference from the UE, obtains the second time difference from the DU, and determines the air interface propagation delay or the UE side timing information based on the first time difference and the second time difference, to implement high-precision timing between the network device and the terminal device in the CU-DU separation architecture.

Optionally, before the first time difference from the UE is received, the method further includes: The CU sends first indication information to the UE. The first indication information indicates the UE to report the first time difference.

In a possible design, the first indication information includes a periodicity in which the UE reports the first time difference to the CU; or a trigger event for which the UE reports the first time difference to the CU.

Optionally, the first indication information further includes information about a cell corresponding to the first time difference reported by the UE.

In a possible design, the trigger event includes at least one of the following: a variation between a first time difference currently measured by the UE and a first time difference reported last time is greater than or equal to a first threshold; and the first time difference currently measured by the UE is greater than or equal to a second threshold.

Optionally, the method further includes: The CU receives, from the UE, the information about the cell corresponding to the first time difference.

Optionally, before the second time difference from the DU is received, the method further includes: The CU sends a third message to the DU. The third message is used to request the second time difference.

In a possible design, that the third message is used to request the second time difference specifically includes: the third message is used to request the DU to send the second time difference to the CU when receiving the third message; or the third message includes a second periodicity, where the second periodicity is a periodicity in which the DU sends the second time difference to the CU.

According to a fifth aspect, a communication method is provided, including: A DU determines a second time difference. The second time difference is a time difference between receiving a first uplink time unit and sending a first downlink time unit by the DU. The DU sends the second time difference to a CU.

According to the foregoing method, the DU sends the second time difference on a DU side to the CU, so that the CU determines an air interface propagation delay or UE side timing information based on the foregoing second time difference, to satisfy high-precision timing between the network device and the terminal device in a CU-DU architecture.

Optionally, before the second time difference is sent to the CU, the method further includes: The DU receives a third message from the CU. The third message is used to request the second time difference.

In a possible design, that the third message is used to request the second time difference specifically includes: the third message is used to request the DU to send the second time difference to the CU when receiving the third message; or the third message includes a second periodicity, where the second periodicity is a periodicity in which the DU sends the second time difference to the CU.

According to a sixth aspect, a communication method is provided, including: UE sends a first time difference to a CU. The UE receives a fourth message from the CU. The fourth message is determined based on the first time difference, the fourth message includes an RTT, an air interface propagation delay, or UE side timing information, the UE side timing information is determined based on the air interface propagation delay, and a value of the air interface propagation delay is equal to half of a value of the RTT.

According to the foregoing method, the UE sends the first time difference on a UE side to the CU, so that the CU determines the air interface propagation delay or the UE side timing information based on the first time difference, to satisfy high-precision timing between the network device and the terminal device in a CU-DU architecture.

Optionally, before the UE sends the first time difference to the CU, the method further includes: The UE receives first indication information from the CU. The first indication information indicates the UE to report the first time difference.

In a possible design, the first indication information includes a periodicity in which the UE reports the first time difference to the CU; or a trigger event for which the UE reports the first time difference to the CU.

Optionally, the first indication information further includes information about a cell corresponding to the first time difference reported by the UE.

In a possible design, the trigger event includes at least one of the following: a variation between a first time difference currently measured by the UE and a first time difference reported last time is greater than or equal to a first threshold; and the first time difference currently measured by the UE is greater than or equal to a second threshold.

Optionally, the foregoing further includes: The UE reports the information about the cell corresponding to the first time difference to the CU.

According to a seventh aspect, a communication method is provided, including: A CU receives a second time difference from a DU. The second time difference is a time difference between receiving a first uplink time unit and sending a first downlink time unit by the DU. The CU sends the second time difference to UE. The second time difference is used by the UE to determine an air interface propagation delay.

According to the foregoing method, the CU notifies the UE of the second time difference on a DU side, and the UE determines the air interface propagation delay based on the second time difference, thereby reducing signaling overheads on a CU side or the DU side.

Optionally, before the second time difference from the DU is received, the method further includes: The CU receives a first request from the UE. The first request is used to request the second time difference.

Optionally, the first request includes information about a cell corresponding to the second time difference.

Optionally, before the CU receives the second time difference from the DU, the method further includes: The CU sends a third message to the DU. The third message is used to request the second time difference.

In a possible design, that the third message is used to request the second time difference specifically includes: the third message is used to request the DU to send the second time difference to the CU when receiving the third message; or the third message includes a third periodicity, where the third periodicity is a periodicity in which the DU sends the second time difference to the CU.

Optionally, the method further includes: The CU sends the information about the cell corresponding to the second time difference to the UE.

According to an eighth aspect, a communication method is provided, including: A DU determines a second time difference. The second time difference is a time difference between receiving a first uplink time unit and sending a first downlink time unit by the DU. The DU sends the second time difference to a CU.

Optionally, before the DU sends the second time difference to the CU, the method further includes: The DU receives a third message from the CU. The third message is used to request the second time difference.

In a possible design, that the third message is used to request the second time difference specifically includes: the third message is used to request the DU to send the second time difference to the CU when receiving the third message; or the third message includes a second periodicity, where the second periodicity is a periodicity in which the DU sends the second time difference to the CU.

According to a ninth aspect, a communication method is provided, including: UE receives a first time difference from a CU. The first time difference is a time difference between receiving a first uplink time unit and sending a first downlink time unit by the CU. The UE determines an air interface propagation delay based on the first time difference and a second time difference.

According to the foregoing method, when the CU receives a request for the second time difference, the CU directly triggers a DU to send the second time difference to the UE, and the second time difference does not need to be forwarded by the CU, thereby reducing signaling overheads.

Optionally, before the UE receives the first time difference from the CU, the method further includes: A first message is sent to the CU, where the first message is used to request the first time difference.

Optionally, the first message further includes information about a cell corresponding to the first time difference.

According to a tenth aspect, a communication method is provided, including: A CU receives a first request from UE. The first request is used to request a second time difference between receiving a first uplink time unit and sending a first downlink time unit by a DU. The CU sends a fifth message to the DU. The fifth message is used to request the DU to send the second time difference to the UE.

Optionally, the fifth message carries information about a cell corresponding to the second time difference.

In a possible design, the fifth message is used to request the DU to send the second time difference to the UE, and the fifth message further includes: the fifth message indicates the DU to send the second time difference to the UE when receiving the fifth message; or the fifth message includes a third periodicity, and the third periodicity is a periodicity in which the DU sends the second time difference to the UE.

According to an eleventh aspect, a communication method is provided, including: A DU receives a fifth message from a CU. The fifth message is used to request the DU to send a second time difference to UE, and the second time difference is a time difference between receiving a first uplink time unit and sending a first downlink time unit by the DU. The second time difference is sent to the UE. The second time difference is for determining an air interface propagation delay.

Optionally, the method further includes: The DU sends information about a cell corresponding to the second time difference to the UE.

According to a twelfth aspect, a communication method is provided, including: UE receives a second time difference from a DU. The second time difference is a time difference between receiving a first uplink time unit and sending a first downlink time unit by the DU. The UE determines an air interface propagation delay based on a first time difference and the second time difference. The first time difference is a time difference between receiving the first downlink time unit and sending the first uplink time unit by the UE.

Optionally, before the UE receives the second time difference from the DU, the method further includes: The UE sends a first request to a CU. The first request is used to request the second time difference.

According to a thirteenth aspect, a communication apparatus is provided, including an apparatus configured to implement any one of the first aspect to the twelfth aspect.

According to a fourteenth aspect, a communication apparatus is provided, including a processor and an interface circuit. The interface circuit is configured to: receive a signal from a communication apparatus other than the communication apparatus and transmit the signal to the processor, or send a signal from the processor to a communication apparatus other than the communication apparatus. The processor is configured to implement, by using a logic circuit or executing code instructions, the method in any implementation of the first aspect to the twelfth aspect.

According to a fifteenth aspect, a computer-readable storage medium is provided. The computer-readable storage medium stores a computer program or instructions. When the computer program or the instructions are executed, the method in any implementation of the first aspect to the twelfth aspect is implemented.

According to a sixteenth aspect, a computer program product including instructions is provided. When the instructions are run, the method in any implementation of the first aspect to the twelfth aspect is implemented.

According to a seventeenth aspect, a chip system is provided. The chip system includes a processor, and may further include a memory. The chip system is configured to implement the method according to any one of the first aspect to the twelfth aspect. The chip system may include a chip, or may include a chip and another discrete component.

DETAILED DESCRIPTION OF ILLUSTRATIVE EMBODIMENTS

The following clearly describes technical solutions in embodiments of this application with reference to the accompanying drawings in embodiments of this application.

Figure 1:
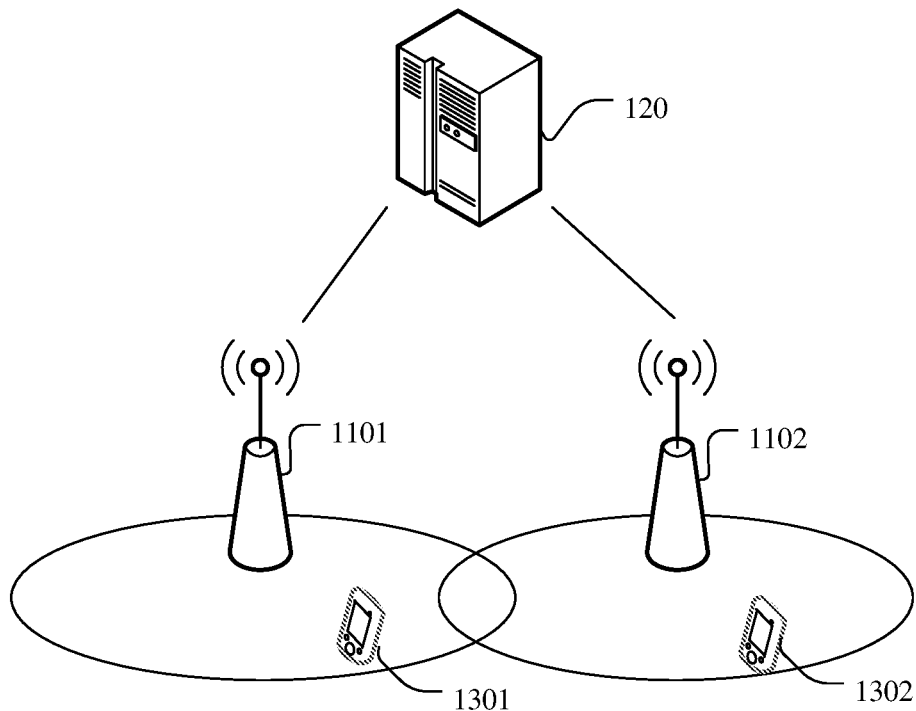
FIG. 1 is a schematic diagram of a network architecture according to an embodiment of this application.

FIG. 1 is a schematic diagram of a network architecture to which an embodiment of this application is applicable. As shown in FIG. 1, a terminal device (for example, a terminal device 1301 or a terminal device 1302) may access a radio network, to obtain a service of an external network (for example, the Internet) via the radio network, or communicate with another device via the radio network, for example, may communicate with another terminal device. The radio network includes a radio access network (RAN) and a core network (CN). The RAN is configured to connect the terminal device to the radio network, and the CN is configured to manage the terminal device and provide a gateway for communicating with the external network.

The following separately describes in detail the terminal device, the RAN, and the CN in FIG. 1.

1. Terminal Device

The terminal device includes a device that provides a user with voice and/or data connectivity, for example, may include a handheld device with a wireless connection function or a processing device connected to a radio modem. The terminal device may communicate with a core network through a radio access network (RAN), and exchange a voice and/or data with the RAN. The terminal device may include user equipment (UE), a wireless terminal device, a mobile terminal device, a device-to-device (D2D) terminal device, a vehicle to everything (V2X) terminal device, a machine-to-machine/machine-type communication (M2M/MTC) terminal device, an Internet of Things (IoT) terminal device, a subscriber unit, a subscriber station, a mobile station, a remote station, an access point, a remote terminal, an access terminal, a user terminal, a user agent, a user device, or the like. For example, the terminal device may include a mobile phone (or referred to as a "cellular" phone), a computer with a mobile terminal device, or a portable, pocket-sized, handheld, or computer built-in mobile apparatus. For example, the terminal device may be a device such as a personal communications service (PCS) phone, a cordless telephone set, a session initiation protocol (SIP) phone, a wireless local loop (WLL) station, or a personal digital assistant (PDA). The terminal device may alternatively include a limited device, for example, a device with relatively low power consumption, a device with a limited storage capability, or a device with a limited computing capability. For example, the terminal device includes an information sensing device such as a barcode, radio frequency identification (RFID), a sensor, a global positioning system (GPS), or a laser scanner.

2. RAN

The RAN may include one or more RAN devices, for example, a RAN device 1101 and a RAN device 1102. An interface between the RAN device and the terminal device may be a Uu interface (or referred to as an air interface). Certainly, in future communication, names of these interfaces may remain unchanged, or may be replaced with other names. This is not limited in this application.

The RAN device is a node or a device that enables the terminal device to access the radio network. The RAN device may also be referred to as a network device or a base station. The RAN device includes, for example, but is not limited to, a next-generation NodeB (gNB), an evolved NodeB (eNB), a radio network controller (RNC), a NodeB (NB), a base station controller (BSC), a base transceiver station (BTS), a home base station (for example, a home evolved NodeB, or a home NodeB, HNB), a baseband unit (BBU), a transmission and reception point (TRP), a transmission point (TP), and a mobile switching center in a 5G communication system.

(1) Protocol Layer Structure

Communication between the RAN device and the terminal device complies with a specific protocol layer structure. For example, a control plane protocol layer structure may include functions of protocol layers such as a radio resource control (RRC) layer, a packet data convergence protocol (PDCP) layer, a radio link control (RLC) layer, a media access control (MAC) layer, and a physical layer. A user plane protocol layer structure may include functions of protocol layers such as the PDCP layer, the RLC layer, the MAC layer, and the physical layer. In a possible implementation, a service data adaptation protocol (SDAP) layer may be further included above the PDCP layer.

Figure 2A:
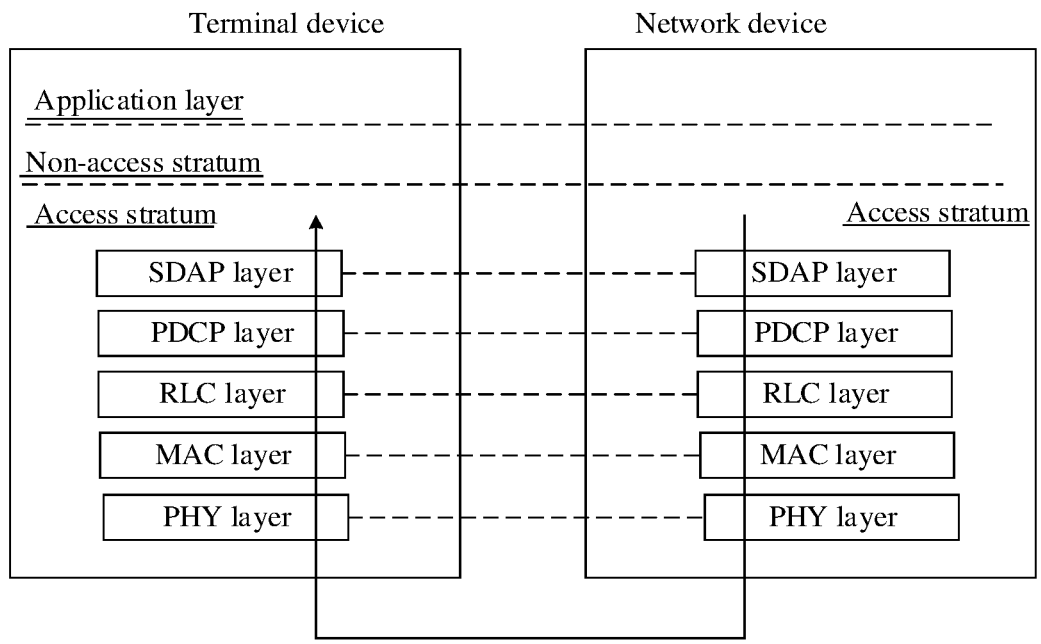
FIG. 2A, FIG. 2B, FIG. 2C, and FIG. 2D are schematic diagrams of a protocol stack according to an embodiment of this application.

Data transmission between the network device and the terminal device is used as an example. Data transmission needs to pass through a user plane protocol layer, for example, the SDAP layer, the PDCP layer, the RLC layer, the MAC layer, or the physical layer. The SDAP layer, the PDCP layer, the RLC layer, the MAC layer, and the physical layer may also be collectively referred to as an access stratum. Because a data transmission direction is divided into sending and receiving, each layer is further divided into a sending part and a receiving part. The following uses data transmission as an example. FIG. 2A is a schematic diagram of downlink data transmission between layers. In FIG. 2A, a downward arrow represents data sending, and an upward arrow represents data receiving. After obtaining data from an upper layer, the PDCP layer transmits the data to the RLC layer and the MAC layer, the MAC layer generates a transport block, and then wireless transmission is performed through the physical layer. Data is correspondingly encapsulated at each layer. Data received by a layer from an upper layer of the layer is considered as a service data unit (SDU) of the layer. After being encapsulated at the layer, the data becomes a PDU, and is then transferred to a next layer.

For example, it can be further learned from FIG. 2A that, the terminal device further has an application layer and a non-access stratum. The application layer may be configured to provide a service for an application program installed on the terminal device. For example, downlink data received by the terminal device may be sequentially transmitted from the physical layer to the application layer, and then is provided by the application layer for the application program. For another example, the application layer may obtain data generated by the application program, sequentially transmit the data to the physical layer, and send the data to another communication apparatus. The non-access stratum may be configured to forward user data. For example, the non-access stratum forwards uplink data received from the application layer to the SDAP layer, or forwards downlink data received from the SDAP layer to the application layer.

(2) CU and DU

Figure 2B:
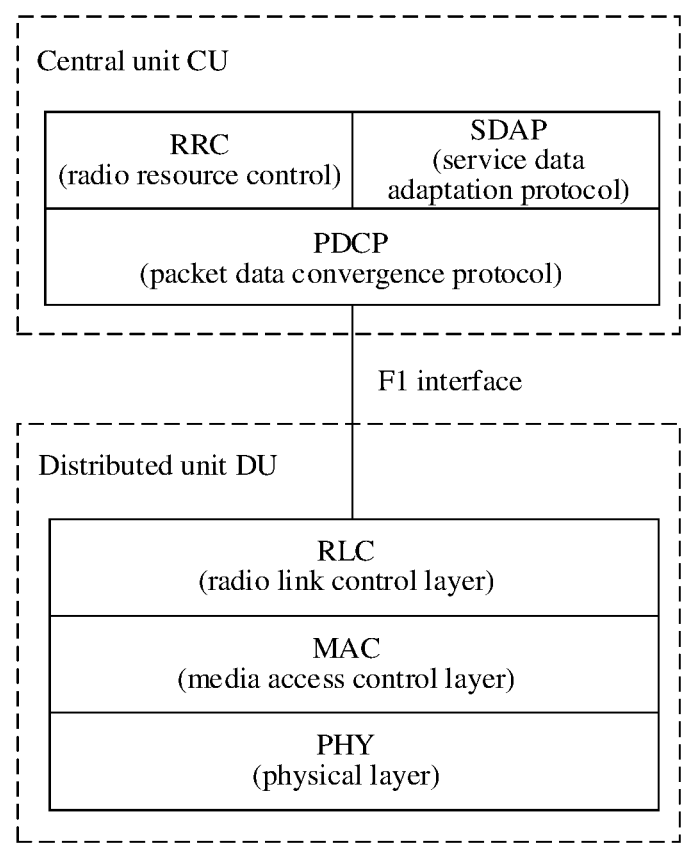
Figure 2C:
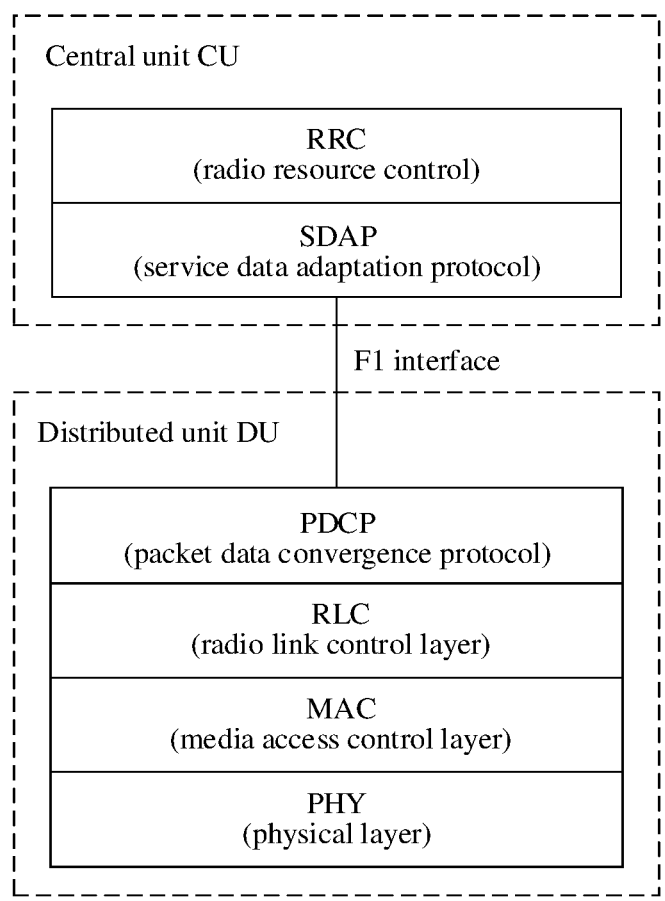

In embodiments of this application, the RAN device may include a CU and a DU, and a plurality of DUs may be controlled by the CU in a centralized manner. For example, an interface between the CU and the DU may be referred to as an F1 interface. A control plane (CP) interface may be an F1-C interface, and a user plane (UP) interface may be an F1-U interface. The CU and the DU may be divided based on protocol layers of the radio network. For example, as shown in FIG. 2b, functions of the PDCP layer and protocol layers above the PDCP layer are disposed on the CU, and functions of protocol layers below the PDCP layer (for example, the RLC layer and the MAC layer) are disposed on the DU. For another example, as shown in FIG. 2C, functions of protocol layers above the PDCP layer are disposed on the CU, and functions of the PDCP layer and protocol layers below the PDCP layer are disposed on the DU.

It may be understood that processing function division of the CU and the DU based on the protocol layers is merely an example, and there may be other division. For example, the CU or the DU may be divided into functions having more protocol layers. For another example, the CU or the DU may be further divided into some processing functions having protocol layers. In a design, some functions of the RLC layer and functions of the protocol layers above the RLC layer are set on the CU, and remaining functions of the RLC layer and functions of the protocol layers below the RLC layer are set on the DU. In another design, division of functions of the CU or the DU may alternatively be performed based on service types or other system requirements. For example, division may be performed based on latencies. Functions whose processing time needs to satisfy a latency requirement are set on the DU, and functions whose processing time does not need to satisfy the latency requirement are set on the CU. In another design, the CU may alternatively have one or more functions of the core network. For example, the CU may be set on a network side for ease of centralized management; and the DU may have a plurality of radio frequency functions, or the radio frequency functions may be set remotely. This is not limited in embodiments of this application.

Figure 2D:
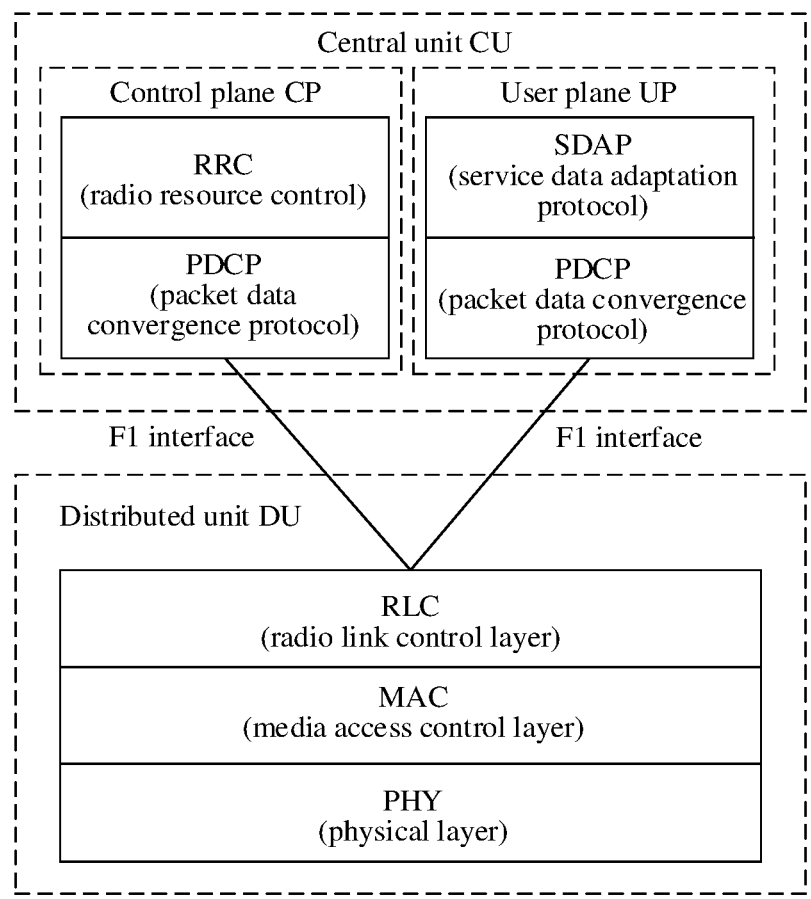

For example, the functions of the CU may be implemented by one entity or different entities. For example, as shown in FIG. 2D, the functions of the CU may be further divided. To be specific, a control plane and a user plane are separated and are implemented by different entities: a control plane CU (CU-CP) entity and a user plane CU (CU-UP)

entity. The CU-CP entity and the CU-UP entity may be coupled to the DU, to jointly complete functions of the RAN device.

It should be noted that in the architectures shown in FIG. 2b to FIG. 2D, signaling generated by the CU may be sent to the terminal device via the DU, or signaling generated by the terminal device may be sent to the CU via the DU. The DU may transparently transmit the signaling to the terminal device or the CU by directly encapsulating the signaling at a protocol layer without parsing the signaling. In the following embodiments, if transmission of such signaling between the DU and the terminal device is involved, sending or receiving of the signaling by the DU includes this scenario. For example, signaling at the RRC or PDCP layer is finally processed as signaling at the physical layer and sent to the terminal device, or is converted from signaling received from the physical layer. In this architecture, it may also be considered that the signaling at the RRC layer or the PDCP layer is sent by the DU, or sent by the DU and a radio frequency apparatus.

3. CN

The CN may include one or more CN devices, for example, a CN device 120. Using the 5G communication system as an example, the CN may include an access and mobility management function (AMF) network element, a session management function (SMF) network element, a user plane function (UPF) network element, a policy control function (PCF) network element, a unified data management (UDM) network element, an application function (AF) network element, and the like.

It should be understood that quantities of devices in the communication system shown in FIG. 1 are merely used as an example. This embodiment of this application is not limited thereto. In an actual application, the communication system may further include more terminal devices and more RAN devices, and may further include another device.

The network architecture shown in FIG. 1 is applicable to communication systems of various radio access technologies (RAT), for example, may be a 4G (or referred to as LTE) communication system, or may be a 5G (or referred to as NR) communication system, or may be a transition system between the LTE communication system and the 5G communication system. The transition system may also be referred to as a 4.5G communication system, or may be certainly a future communication system, for example, a 6G communication system. The network architecture and the service scenario described in embodiments of this application are intended to describe the technical solutions in embodiments of this application more clearly, and do not constitute a limitation on the technical solutions provided in embodiments of this application. A person of ordinary skill in the art may know that, with evolution of the communication network architecture and emergence of new service scenarios, the technical solutions provided in embodiments of this application are also applicable to similar technical problems.

The following first explains and describes related technical features in embodiments of this application. It should be noted that these explanations are intended to make embodiments of this application easier to understand, but should not be considered as a limitation on the protection scope claimed in this application.

1. High-Precision Timing

In an LTE or NR system, a base station sends high-precision timing information to UE in a broadcast or unicast manner, to implement high-precision timing. Due to a propagation delay between the base station and the UE, for a high-precision time on a UE side, the propagation delay actually needs to be added to high-precision time information on a base station side.

In a possible design, a round-trip time (RTT) may be determined by using a time difference (referred to as a downlink receiving-uplink sending time difference below) between downlink receiving and uplink sending of the UE and a time difference (referred to as an uplink receiving-downlink sending time difference below) between uplink receiving and downlink sending of the base station, where RTT=(gNB receiving-sending time difference)+(UE receiving-sending time difference), to determine an air interface propagation delay RTT/2. Precision of the air interface propagation delay obtained in this way is about wo ns (nanosecond), which is higher.

2. RTT Determining Process

Figure 3:
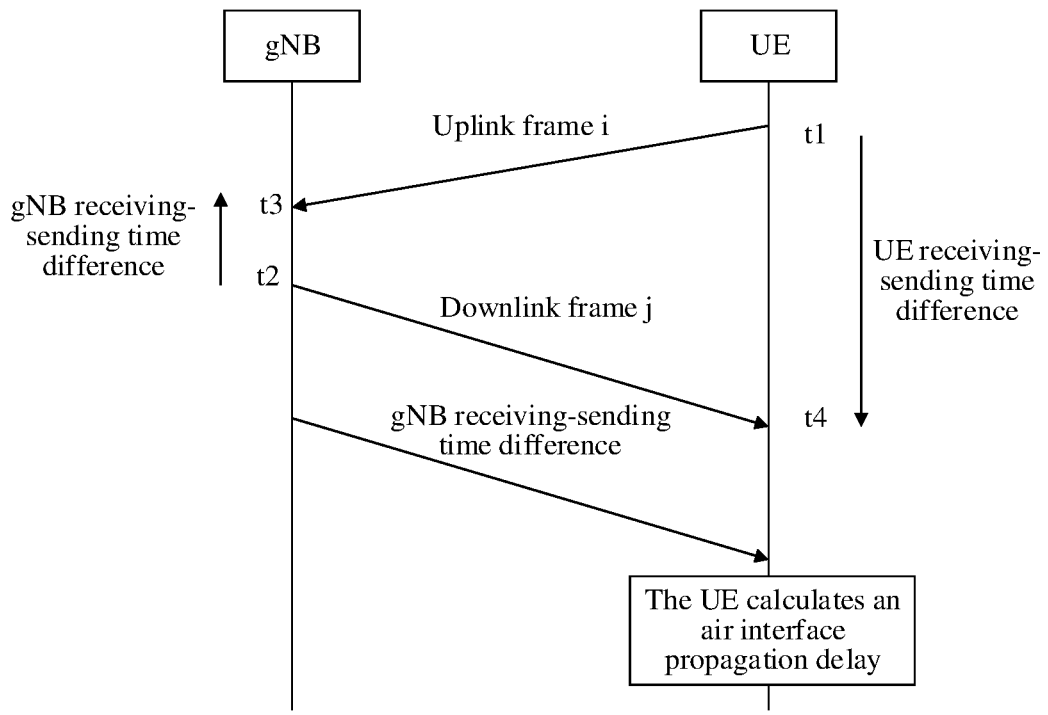
FIG. 3 is a schematic diagram of calculating an air interface propagation delay by UE according to an embodiment of this application.

In a current solution, there are two solutions for determining an RTT. In a first solution, a gNB sends an uplink receiving-downlink sending time difference of the gNB in a cell to UE, and the UE determines the RTT based on the uplink receiving-downlink sending time difference of the gNB and a downlink receiving-uplink sending time difference of the UE in the cell. As shown in FIG. 3, a possible procedure is provided, including the following steps:

the UE sends an uplink frame i, and records a sending time T1 of the uplink frame i;

the gNB receives the uplink frame i, and records an arrival time T3 of the uplink frame i;

the gNB sends a downlink frame j to the UE, and records a sending time T2 of the downlink frame j;

the UE receives the downlink frame j, and records an arrival time T4 of the downlink frame j;

the gNB sends a receiving-sending time difference (T3−T2) to the UE. A value of the time difference may be a positive number or a negative number, which specifically depends on whether the gNB sends the downlink frame before or after receiving the uplink frame; and the UE determines an air interface propagation delay. A calculation formula of the air interface propagation delay is: RTT=(gNB receiving-sending time difference)+(UE receiving-sending time difference), where the gNB receiving-sending time difference is T3−T2, and the UE receiving-sending time difference=T4−T1. Assuming that an uplink propagation delay and a downlink propagation delay are symmetric, a unidirectional air interface propagation delay is RTT/2.

Figure 4:
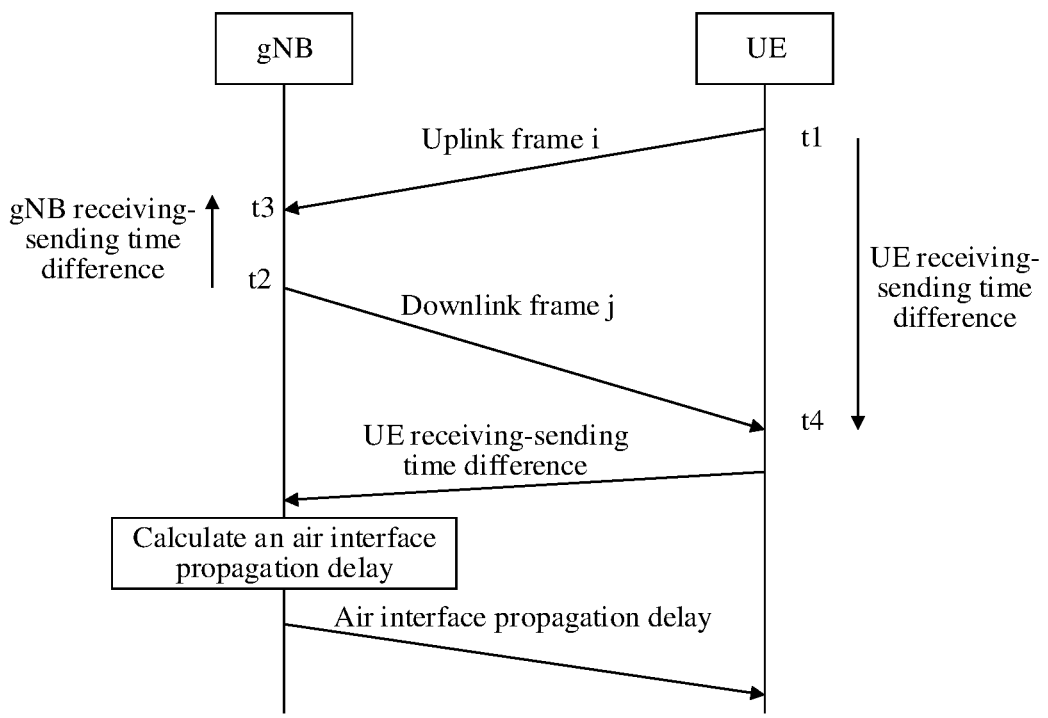
FIG. 4 is a schematic diagram of calculating an air interface propagation delay by a gNB according to an embodiment of this application.

In a second solution, UE sends a receiving-sending time difference of the UE in a cell to a gNB, and the gNB determines an air interface propagation delay based on the receiving-sending time difference of the UE and a receiving-sending time difference of the gNB in the cell and then sends the air interface propagation delay to the UE. As shown in FIG. 4, a possible procedure is provided, including the following steps:

the UE sends an uplink frame i, and records a sending time T1 of the uplink frame i;

the gNB receives the uplink frame i, and records an arrival time T3 of the uplink frame i;

the gNB sends a downlink frame j to the UE, and records a sending time T2 of the downlink frame j;

the UE receives the downlink frame j, and records an arrival time T4 of the downlink frame j;

the UE sends a UE receiving-sending time difference (T4−T1) to the base station. A value of the time difference may be a positive number or a negative number, which specifically depends on whether the UE sends the uplink frame before or after receiving the downlink frame;

the gNB calculates an air interface propagation delay of which a calculation formula is: RTT=(gNB receiving-sending time difference)+(UE receiving-sending time difference) Assuming that an uplink propagation delay and a downlink propagation delay are symmetric, a unidirectional air interface propagation delay is RTT/2; and the gNB sends the air interface propagation delay to the UE.

It should be indicated that, to facilitate understanding of a relationship between the foregoing RTT and the air interface propagation delay, the foregoing formula may be deduced slightly: RTT=(uplink frame i received by the gNB−downlink frame j sent by the gNB)+(downlink frame j received by the UE−uplink frame i sent by the UE)=(uplink frame i received by the gNB−uplink frame i sent by the UE)+(downlink frame j received by the UE−downlink frame j sent by the gNB)=2 times the air interface propagation delay. It can be learned that in this embodiment of this application, the air interface propagation delay may be determined by using any receiving and sending moment of the uplink frame and the downlink frame, and values of i and j may be the same or different.

In the network architecture shown in FIG. 1, in a scenario in which a CU and a DU are separated, there is currently no related solution for determining an air interface propagation delay and further implementing high-precision time synchronization between a terminal device and a wireless network side.

Based on the foregoing description, this embodiment of this application provides the following solutions. Because the DU includes a receiving-sending time difference on a DU side, and a UE includes a receiving-sending time difference on a UE side, the following solutions are provided in this embodiment of this application.

Solution 1: The DU may obtain the receiving-sending time difference on the UE side from the UE, and determine the air interface propagation delay based on the receiving-sending time difference on the UE side and the receiving-sending time difference on the DU side. For details, refer to the following records in Embodiment 1.

Solution 2: The CU may obtain the receiving-sending time difference on the DU side from the DU, obtain the receiving-sending time difference on the UE side from the UE, and determine the air interface propagation delay based on the two. For details, refer to the following records in Embodiment 2.

Solution 3: The CU may obtain the receiving-sending time difference on the DU side from the DU, and send the receiving-sending time difference on the DU side to the UE. The UE determines the air interface propagation delay based on the receiving-sending time difference on the DU side. For details, refer to the following records in Embodiment 3.

Solution 4: The UE may send, to the CU, a first message for obtaining the receiving-sending time difference of the DU; after receiving the first message, the CU sends a second message to the DU; and after receiving the second message, the DU sends the receiving-sending time difference on the DU side to the UE. For details, refer to the following records in Embodiment 4.

Solution 5: The DU or the CU may send indication information to the UE, to indicate the UE to report the receiving-sending time difference on the UE side to the DU; and the DU receives the receiving-sending time difference on the UE side from the UE and determines the air interface propagation delay based on the time difference.

It should be noted that in the following description, details are as follows:

1. A first communication apparatus may be a DU or a chip in the DU, a second communication apparatus may be a CU or a chip in the CU, and a terminal device may be a terminal device or a chip in the terminal device.

2. The receiving-sending time difference of the UE is referred to as a first time difference, and the first time difference is specifically a time difference between receiving a first downlink time unit and sending a first uplink time unit by the UE. The receiving-sending time difference on the DU side is referred to as a second time difference, and the second time difference is specifically a time difference between receiving a first uplink time unit and sending a first downlink time unit by the DU.

Optionally, a time unit in this embodiment of this application may be a radio frame, a subframe, a slot, a mini-slot, a symbol, or the like. In the following description, an example in which the time unit is a subframe is used for description.

Figure 5:
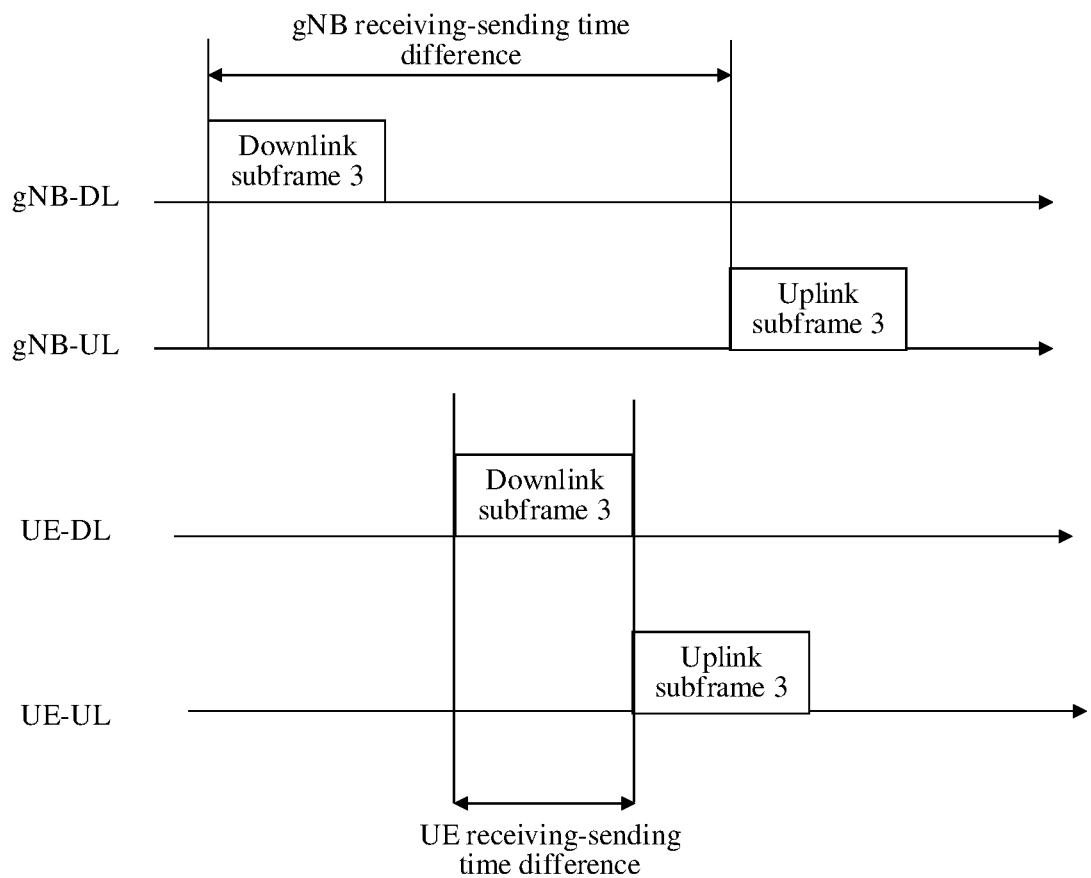
FIG. 5 is a schematic diagram of a first time difference and a second time difference according to an embodiment of this application.

As shown in FIG. 5, a gNB sends a downlink subframe 3, and UE sends an uplink subframe 3. In this case, the UE receiving-sending time difference is a time difference between receiving the downlink subframe 3 and sending the uplink subframe 3 by the UE, and the gNB receiving-sending time difference is a time difference between receiving the uplink subframe 3 and sending the downlink subframe 3 by the gNB.

3. DU side timing information is a reference time of a frame boundary of a radio frame or a subframe on a base station side, and may be understood as a time for which propagation delay compensation is not performed. UE side timing information is a reference time of a frame boundary of a radio frame or a subframe on the UE side, and may be considered as a time for which air interface propagation delay compensation is performed. In embodiments of this application, the DU side timing information may be sent by the DU to the UE or sent by the CU to the UE. If the DU side timing information is sent by the CU to the UE, the CU needs to obtain the foregoing DU side timing information from the DU in advance. The DU side timing information may also be referred to as network side timing information.

Optionally, the DU side timing information includes at least one of the following:

DU side reference time, including:
n of days relative to a start time;
number of seconds;
number of milliseconds; and
number whose unit is 10 nanoseconds, where
the DU side reference time represents a reference time relative to an agreed start time point, which is equal to: number of days*86400*1000*100000+number of seconds*1000*100000+number of milliseconds*100000+number of ten nanoseconds whose unit is nanoseconds;
reference system frame number (SFN);
clock type: a local clock or a global positioning system (GPS) clock; and
error value. Optionally, if the error value is carried, the UE may determine the UE side timing information based on the error value and the DU side reference time. In other words, in addition to impact of the air interface propagation delay, impact of the foregoing error value also needs to be considered for the UE side timing information.

Figure 6:
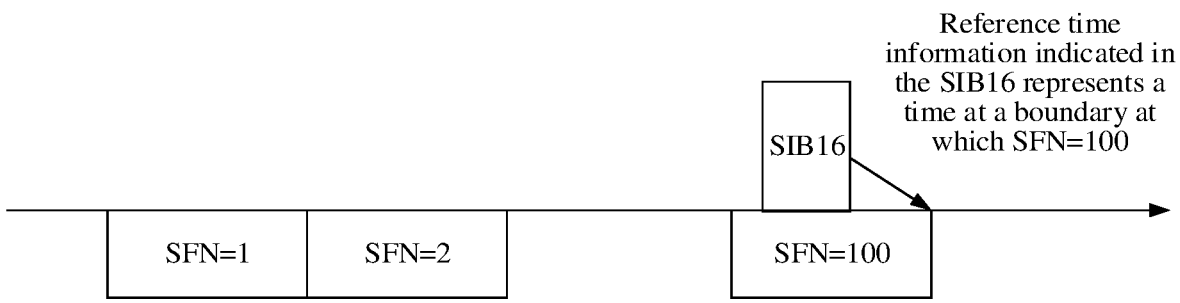
FIG. 6 is a schematic diagram of sending DU side timing information by using an SIB according to an embodiment of this application.

In an example, the DU or the CU may send the DU side timing information to the UE in a broadcast manner. The DU side timing information does not need to carry the foregoing reference SFN, and the reference SFN may be implicitly indicated by using a broadcast message. For example, as shown in FIG. 6, if the DU side timing information is sent by using a system information block (SIB) 16, a boundary location of an SFN100 that carries the SIB16 is a location of a DU reference time indicated by the foregoing DU side timing information.

In another example, the DU or the CU may send the DU side timing information to the UE in a unicast manner by using dedicated signaling, and the foregoing DU side timing information needs to carry the foregoing reference SFN.

4. In the following Embodiment 1 and Embodiment 2, information that is sent by the CU to the UE and that indicates the UE to report the first time difference is referred to as first indication information. The first indication information may be but is not limited to:

the SIB, a master information block (MIB), an RRC reconfiguration message, an RRC connection resume (RRC resume) message, a downlink information transfer (DL information transfer) message, an RRC reestablishment message, a downlink information transfer multi-rat dual-connectivity (DL information transfer, multi-rat dual-connectivity, MRDC) message, a logged measurement configuration message, a UE information request message, a handover command (mobility from NR command) message, or a measurement configuration message.

For example, the foregoing first indication information includes any one of the following:

a periodicity in which the UE reports the first time difference to the CU; or a trigger event for which the UE reports the first time difference to the CU; and optionally, the trigger event includes any one of the following:

a variation between a first time difference currently measured by the UE and a first time difference reported last time is greater than or equal to a first threshold;

the first time difference currently measured by the UE is greater than or equal to a second threshold; and a difference between the first time difference currently measured by the UE and a hysteresis value is greater than or equal to a third threshold, and duration that is continuously satisfied is greater than T. Optionally, the foregoing hysteresis value may be a parameter used in an entering condition and a leaving condition of an event-triggered reporting condition.

Optionally, the first indication information may further include information about a cell corresponding to the first time difference. The information about the cell may be information about a primary cell (PCell), a primary secondary cell (PSCell), a secondary cell (SCell), or the like. If the foregoing first indication information does not carry the information about the cell, the UE may report the first time difference of a predefined cell. The predefined cell may be a PCell, a PSCell, an SCell, or the like. This is not limited.

5. In the following Embodiment 1 and Embodiment 2, the first time difference sent by the UE to the CU based on the first indication information may be carried in any one of the following messages: a UE assistance information message, a measurement report message, an RRC reconfiguration complete message, an RRC reestablishment complete message, an RRC resume complete message, an uplink information transfer (UL information transfer) message, a UE information response message, an uplink information transfer multi-rat dual-connectivity (UL information transfer MRDC) message, or the like.

Optionally, in addition to sending the first time difference to the CU, the UE may further send the information about the cell corresponding to the first time difference to the CU. Optionally, when the UE does not send the information about the cell corresponding to the first time difference to the CU, the CU may consider that the UE reports the first time difference of the predefined cell, and the predefined cell, the same as the foregoing, may be a PCell, a PSCell, an SCell, or the like. The UE may determine a difference between a currently measured first time difference and a first time difference sent last time. If the difference is less than a predefined threshold, the UE no longer sends the first time difference to the CU. In this way, the UE can be prevented from frequently sending the first time difference to the CU, thereby reducing signaling overheads. The predefined threshold of the foregoing first time difference may be configured by the CU or the DU for the UE. For example, the predefined threshold of the foregoing first time difference may be carried in the first indication information.

It should be noted that the following naming manner is used in the following Embodiment 1 and Embodiment 2. In Embodiment 1, refer to FIG. 7. A message that is sent by the DU to the CU and that is used to request the first time difference is referred to as a first message. A message that is sent by the DU to the UE and that carries the RTT, the air interface propagation delay, or terminal device side timing information is referred to as a second message. In Embodiment 2, refer to FIG. 9. A message that is sent by the CU to the DU and that is used to request the second time difference is referred to as a third message. A message that is sent by the CU to the UE and that carries the RTT, the air interface propagation delay, or the terminal device side timing information is referred to as a fourth message.

Figure 11:
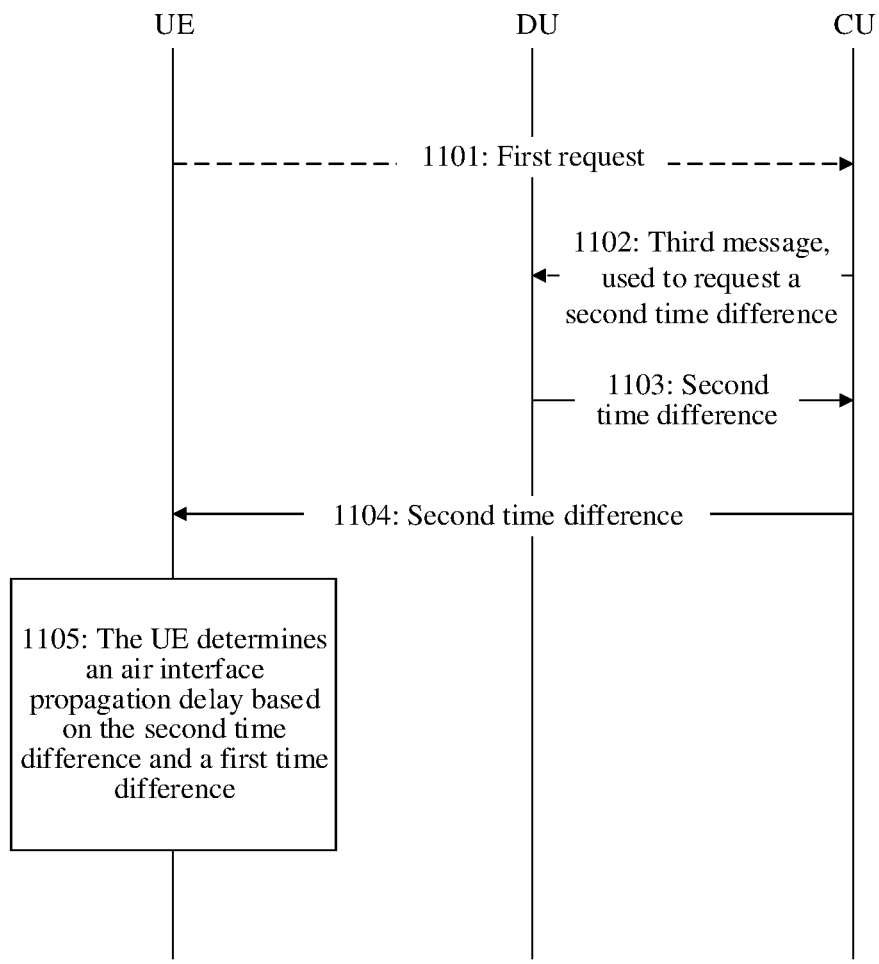
FIG. 11 is a flowchart of a communication method corresponding to Embodiment 3 of this application.

In addition, refer to FIG. 11. Because a process in which the CU requests the second time difference from the DU is also involved in Embodiment 3, a message that is sent by the CU to the DU and that is used to request the second time difference is still referred to as the third message named in Embodiment 2. It should be noted that, although the process in which the CU requests the second time difference from the DU is also involved in the following Embodiment 4, the CU actually requests the DU to send the second time difference to the UE. Therefore, a request message is different from the request message in Embodiment 2 and Embodiment 3. Therefore, the foregoing command is not used again. In Embodiment 4, a message that the CU requests the DU to send the second time difference to the UE is referred to as a fifth message. For details, refer to FIG. 12.

Embodiment 1

An embodiment of this application provides a communication method, including: A first communication apparatus receives a first time difference from a second communication apparatus. The first communication apparatus determines an RTT based on the first time difference and a second time difference. The first communication apparatus sends the RTT, an air interface propagation delay, or terminal device side timing information to a terminal device, a value of the air interface propagation delay is equal to half of a value of the RTT, and the terminal device side timing information is determined based on the air interface propagation delay.

Figure 7:
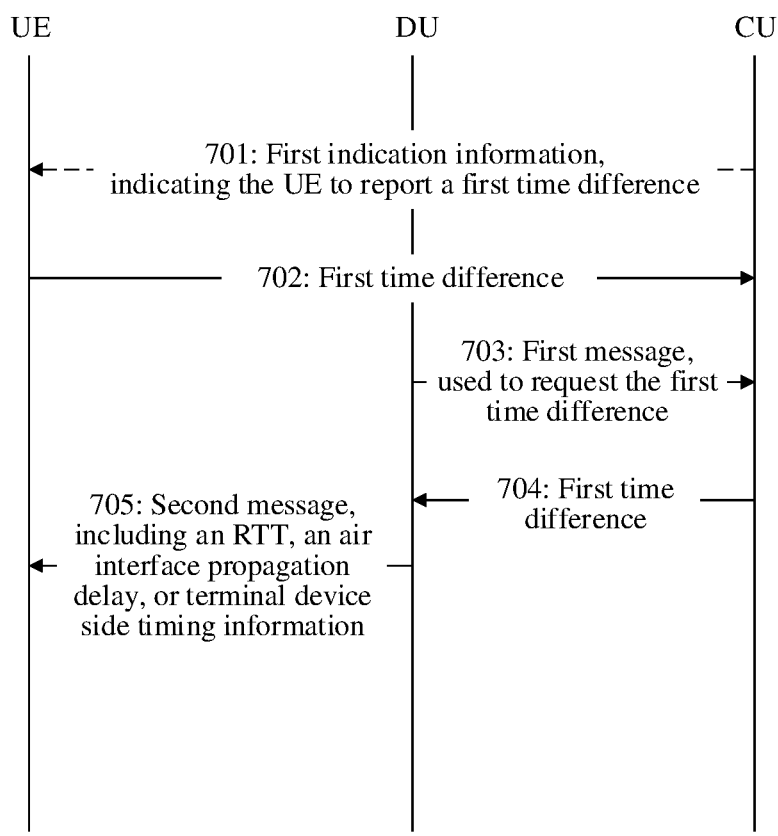
FIG. 7 and FIG. 8 are flowcharts of a communication method corresponding to Embodiment 1 of this application.

In the following description, an example in which the terminal device is UE, the first communication apparatus is a DU, and the second communication apparatus is a CU is used to describe a solution in this embodiment of this application. As shown in FIG. 7, a procedure of a communication method is provided, including the following steps.

Optionally, step 701: A CU sends first indication information to UE, where the first indication information indicates the UE to report a receiving-sending time difference of the UE, that is, a first time difference.

Step 702: The UE sends the first time difference to the CU.

Optionally, step 703: A DU sends a first message to the CU, where the first message is used to request the first time difference.

The first message includes but is not limited to a reference time information reporting message, an uplink RRC message transfer (UL RRC message transfer) message, a UE context setup response message, a UE context modification response message, or the like.

Optionally, that the first message is used to request the first time difference specifically includes: The first message is used to request the CU to send the first time difference to the DU when receiving the first message; or the first message includes a first periodicity, where the first periodicity is a periodicity in which the CU sends the first time difference to the DU. Optionally, the first message may further include indication information indicating the CU to stop sending the first time difference to the DU, and the like.

Optionally, step 701 may alternatively be replaced with the following: The DU sends second indication information to the UE, where the second indication information indicates the UE to report the first time difference to the CU.

The second indication information may be but is not limited to an SIB, an MIB, downlink control information (DCI), a MAC layer message, or the like.

Step 704: The CU sends the first time difference to the DU.

The foregoing first time difference may be carried in any one of the following messages: a reference time information reporting control message, a downlink RRC message transfer (DL RRC message transfer) message, a UE context setup request message, a UE context modification request message, or the like.

Step 705: The DU sends a second message to the UE, where the second message includes an RTT, an air interface propagation delay, or UE side timing information. Optionally, the second message includes but is not limited to DCI, downlink MAC layer signaling, or the like.

Example 1: The second message sent by the DU to the UE includes the RTT or the air interface propagation delay.

In Example 1, the DU may determine the RTT based on the first time difference and the second time difference. The DU may directly send the RTT to the UE, and the UE subsequently determines the air interface propagation delay based on the RTT, and compensates for network side timing by using the air interface propagation delay. Alternatively, the DU may directly send the air interface propagation delay to the UE.

In this example, if the DU sends the air interface propagation delay to the UE, the DU may determine a difference between a current air interface propagation delay and an air interface propagation delay sent last time. If the difference is less than a predefined threshold, the DU may no longer send the air interface propagation delay to the UE. Similarly, if the DU sends the RTT to the UE, the DU may determine a difference between a current RTT and an RTT sent last time. If the difference is less than the predefined threshold, the DU may no longer send the RTT to the UE. In this way, the DU can be prevented from frequently sending the air interface propagation delay or the RTT to the UE, thereby reducing signaling overheads. The predefined threshold of the air interface propagation delay or the RTT may be configured by the CU for the DU, or the like. This is not limited.

Figure 8:
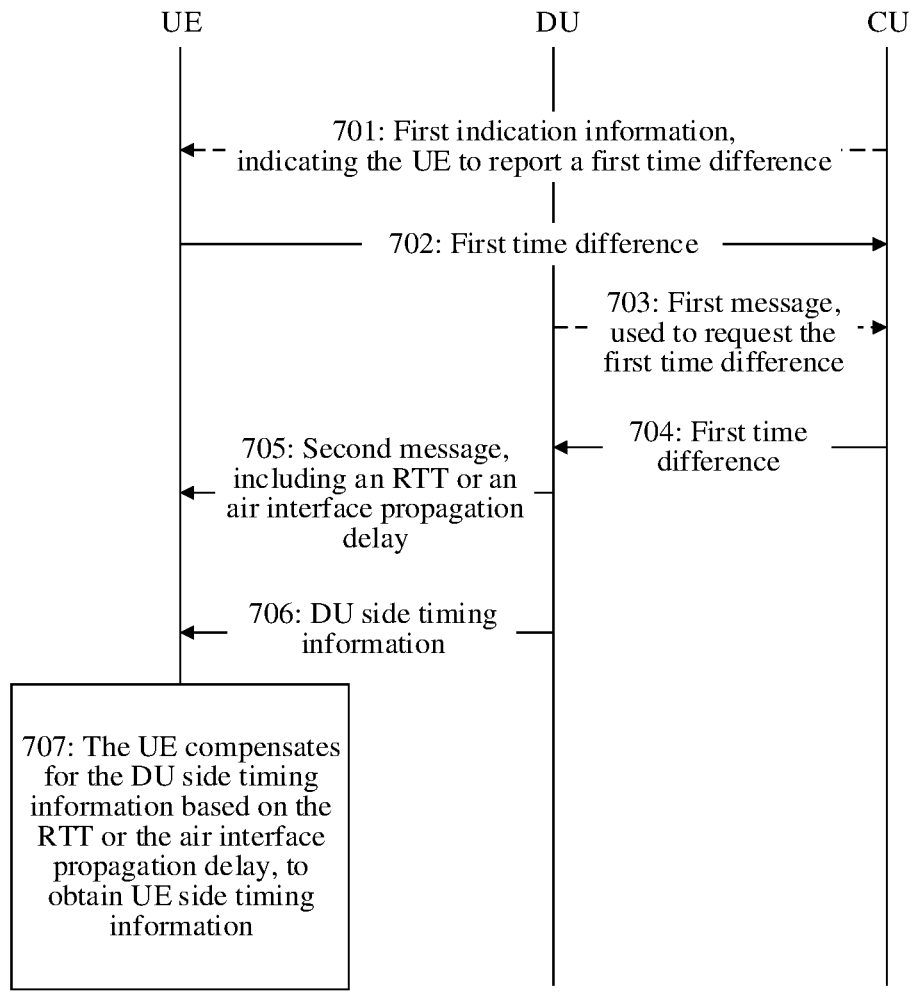

In Example 1, as shown in FIG. 8, in addition to step 701 to step 705, the following steps may be further included.

Step 706: The DU sends DU side timing information to the UE. Alternatively, step 706 may be replaced with the following: The CU sends DU side timing information to the UE.

Step 707: The UE compensates for the DU side timing information based on the RTT or the air interface propagation delay received in step 705, to obtain UE side timing information.

The UE side timing information is equal to a sum of the DU side timing information and the air interface propagation delay. Optionally, the UE may further provide the UE side timing information for an application layer.

In the foregoing example 1, the CU obtains the first time difference from the UE, and sends the first time difference to the DU. The DU determines the RTT or the air interface propagation delay based on the first time difference and the second time difference, and sends the RTT or the air interface propagation delay to the UE. The DU determines the RTT or the air interface propagation delay to reduce power consumption of the UE.

Example 2: The second message sent by the DU to the UE includes the UE side timing information, where the UE side timing information is determined based on the air interface propagation delay.

Optionally, before the DU sends the UE side timing information to the UE by using the second message, the DU may determine a difference between current UE side timing information and UE side timing information sent last time. If the difference is less than the predefined threshold, the DU no longer sends the UE side timing information to the UE. In this way, the DU can be prevented from frequently sending the UE side timing information to the UE, thereby reducing signaling overheads.

In Example 2, after determining the RTT based on the first time difference and the second time difference, the DU obtains the air interface propagation delay. The DU compensates for the DU side timing information based on the air interface propagation delay to obtain the UE side timing information. In addition, the UE side timing information is directly sent to the UE. In this way, the DU directly sends compensated timing information (that is, the UE side timing information) to the UE, and the UE does not need to perform calculation again, thereby reducing power consumption of the UE. In addition, the DU does not need to separately send network side timing information to the UE, thereby reducing signaling overheads.

Embodiment 2

The method includes: A second communication apparatus receives a first time difference from a terminal device. The second communication apparatus receives a second time difference from a first communication apparatus. The second communication apparatus determines an RTT based on the first time difference and the second time difference. The second communication apparatus sends the RTT, an air interface propagation delay, or terminal device side timing information to the terminal device. The terminal device side timing information is determined based on the air interface propagation delay.

Figure 9:
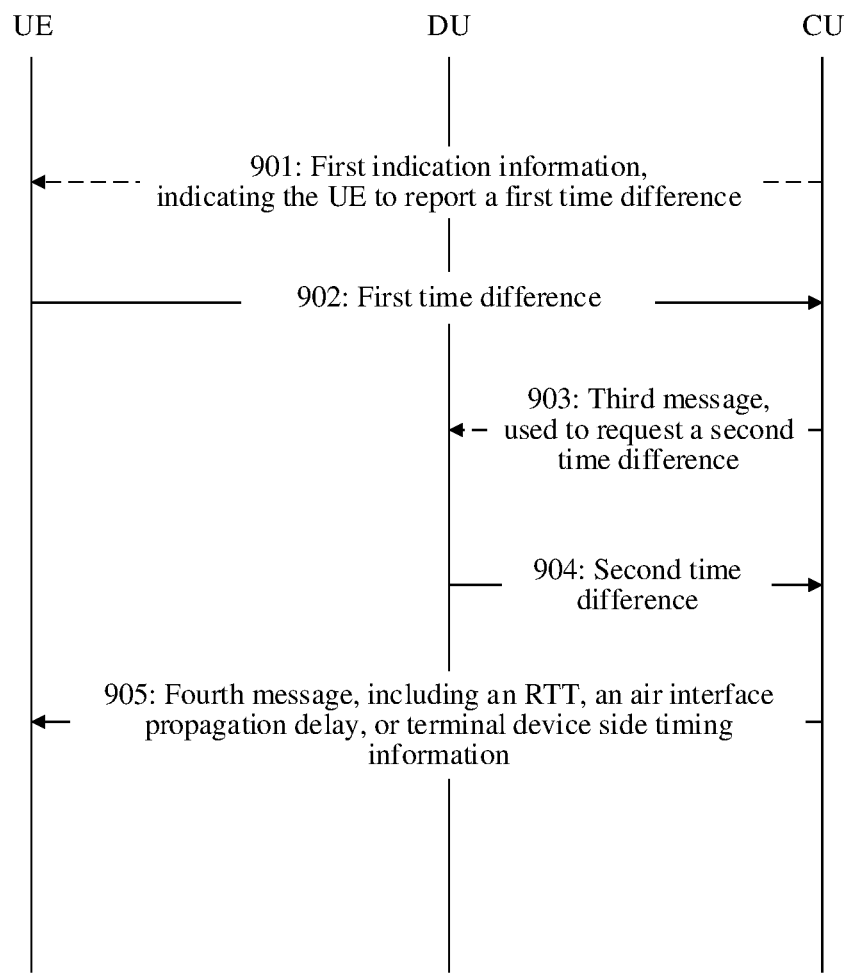
FIG. 9 and FIG. 10 are flowcharts of a communication method corresponding to Embodiment 2 of this application.

As shown in FIG. 9, an example in which the first communication apparatus is a DU, the second communication apparatus is a CU, and the terminal device is UE is used to provide a procedure of a communication method, which includes at least the following steps.

Optionally, step 901: A CU sends first indication information to UE, where the first indication information indicates the UE to report a first time difference.

Step 902: The UE sends the first time difference to the CU.

Optionally, step 903: The CU sends a third message to a DU, where the third message is used to request a second time difference.

The third message may be, but is not limited to, any one of the following messages: a reference time information reporting control message, a downlink RRC message transfer message, a UE context setup request message, a UE context modification request message, or the like.

Optionally, that the third message is used to request the second time difference specifically includes: the third message is used to request the DU to send the second time difference to the CU when receiving the third message; or the third message includes a second periodicity, where the second periodicity is a periodicity in which the DU sends the second time difference to the CU. Optionally, the third message may further include: indication information indicating the DU to stop periodically reporting the second time difference to the CU, and/or information about a cell corresponding to the second time difference.

Step 904: The DU sends the second time difference to the CU.

The second time difference is carried in any one of the following messages: a reference time information reporting message, an uplink RRC message transfer message, a UE context setup response message, a UE context modification response message, or the like.

Optionally, the DU may further send the information about the cell corresponding to the second time difference to the CU. The information about the cell and the second time difference may be carried in a same message or different messages. This is not limited. Optionally, if the DU does not send the information about the cell corresponding to the second time difference to the CU, the DU may consider that the received second time difference belongs to a predefined cell. The predefined cell may be a PCell, a PSCell, an SCell, or the like. This is not limited. The DU may determine a difference between a current second time difference and a second time difference reported last time. If the difference is less than a predefined threshold, the DU no longer sends the second time difference to the CU. In this way, the DU can be prevented from frequently sending the second time difference to the CU. The predefined threshold of the foregoing second time difference may be configured by the CU for the DU.

Step 905: The CU sends a fourth message to the UE, where the fourth message includes an RTT, an air interface propagation delay, or UE side timing information. The fourth message may be but is not limited to any one of the following messages:

DCI, RRC connection setup, an RRC reconfiguration message, an RRC connection resume message, a downlink information transfer message, an RRC reestablishment message, a downlink information transfer multi-rat dual-connectivity message, a logged measurement configuration message, a UE information request message, a handover command message, a measurement configuration message, or the like.

Example 1: The fourth message in step 905 includes the RTT or the air interface propagation delay.

In Example 1, after obtaining the first time difference and the second time difference respectively from the UE and the DU, the CU may determine the RTT based on the first time difference and the second time difference, and directly indicate the RTT to the UE; or the CU may also determine the air interface propagation delay based on the RTT, and indicate the air interface propagation delay to the UE, or the like. This is not limited.

Optionally, the CU may determine a difference between a current RTT and an RTT sent last time. If the difference is less than or equal to the predefined threshold, the CU no longer sends the RTT or the air interface propagation delay to the UE. In this way, the CU may be prevented from frequently sending the RTT or the air interface propagation delay to the UE, thereby reducing signaling overheads.

Figure 10:
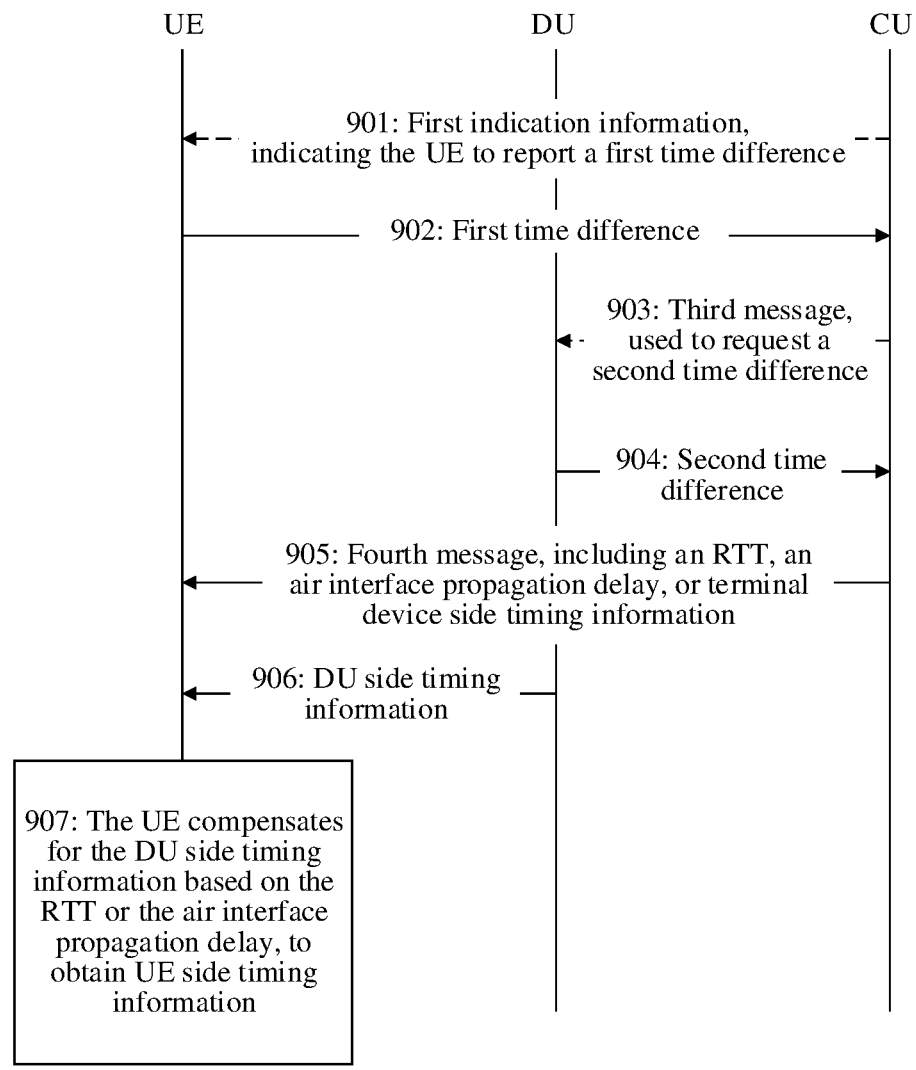

In the foregoing example 1, as shown in FIG. 10, in addition to step 901 to step 905, the following steps may be further included.

Step 906: The DU sends DU side timing information to the UE. Certainly, step 906 may also be replaced with the following: The CU sends DU side timing information to the UE.

Step 907: The UE determines the UE side timing information based on the DU side timing information and the air interface propagation delay. Optionally, the UE side timing information is equal to a sum of the DU side timing information and the air interface propagation delay.

Example 2: The fourth message in step 905 includes the UE side timing information.

Optionally, before the CU sends the UE side timing information to the UE by using the fourth message, the CU may determine a difference between current UE side timing information and UE side timing information sent last time. If the difference is less than the predefined threshold, the CU no longer sends the UE side timing information to the UE. In this way, the CU can be prevented from frequently sending the UE side timing information to the UE, thereby reducing signaling overheads.

In Example 2, after determining the air interface propagation delay, the CU determines the UE side timing information based on the air interface propagation delay and the DU side timing information, and directly indicates the UE side timing information to the UE. In this way, the UE does not need to calculate the UE side timing information by itself, thereby reducing power consumption of the UE. In addition, the CU does not need to send the DU side timing information to the UE, thereby reducing signaling overheads.

Embodiment 3

The method includes: A second communication apparatus receives a second time difference from a first communication apparatus. The second communication apparatus sends the second time difference to a terminal device. The second time difference is used by the terminal device to determine an air interface propagation delay.

As shown in FIG. 11, an example in which the first communication apparatus is a DU, the second communication apparatus is a CU, and the terminal device is UE is used to provide a procedure of a communication method, which includes at least the following steps.

Optionally, step 1101: UE sends a first request to a CU, where the first request is used to request a second time difference.

Optionally, the first request in the foregoing step 1101 may also be replaced with the following: whether the UE supports a capability of receiving the second time difference, where if the UE supports receiving the second time difference, a DU or the CU may send the second time difference to the UE, or if the UE does not support receiving the second time difference, the DU or the CU no longer sends the second time difference to the UE; or whether the UE expects to obtain the second time difference; or the like, where similarly, if the UE expects to obtain the second time difference, the DU or the CU sends the second time difference to the UE, or if the UE does not expect to obtain the second time difference, the DU or the CU no longer sends the second time difference to the UE.

The first request may be but is not limited to a UE assistance information message, a measurement report message, an RRC reconfiguration complete message, an RRC reestablishment complete message, an RRC resume complete message, an uplink information transfer message, a UE information response message, an uplink information transfer multi-rat dual-connectivity message, or the like.

Optionally, the first request may include information about a cell corresponding to the second time difference. If the first request does not include the information about the cell corresponding to the second time difference, the CU or the DU may send the second time difference of a predefined cell to the UE. The predefined cell may be a PCell, a PSCell, an SCell, or the like.

Optionally, step 1102: The CU sends a third message to the DU, where the third message is used to request the second time difference. Similar to the foregoing description, the third message may also be replaced with the following: whether the UE supports receiving the second time difference, whether the UE expects to receive the second time difference, or the like.

Step 1103: The DU sends the second time difference to the CU.

For detailed processes of step 1102 and step 1103, refer to the record in FIG. 9. Details are not described again.

Step 1104: The CU sends the second time difference to the UE.

Optionally, the second time difference may be carried in any one of the following messages: RRC connection setup, an RRC reconfiguration message, an RRC connection resume message, a downlink information transfer message, an RRC reestablishment message, a downlink information transfer multi-rat dual-connectivity message, a logged measurement configuration message, a UE information request message, a handover command message, a measurement configuration message, or the like.

Optionally, the CU may further send the information about the cell corresponding to the second time difference to the UE. The information about the cell and the second time difference may be carried in a same message, or may be carried in different messages. This is not limited.

Step 1105: The UE determines an air interface propagation delay based on the second time difference and a first time difference. Optionally, the UE may compensate for DU side timing information based on the air interface propagation delay.

Embodiment 4

The method includes: A second communication apparatus receives a first request from a terminal device. The first request is used to request a second time difference. The second communication apparatus sends the second time difference to a first communication apparatus.

Figure 12:
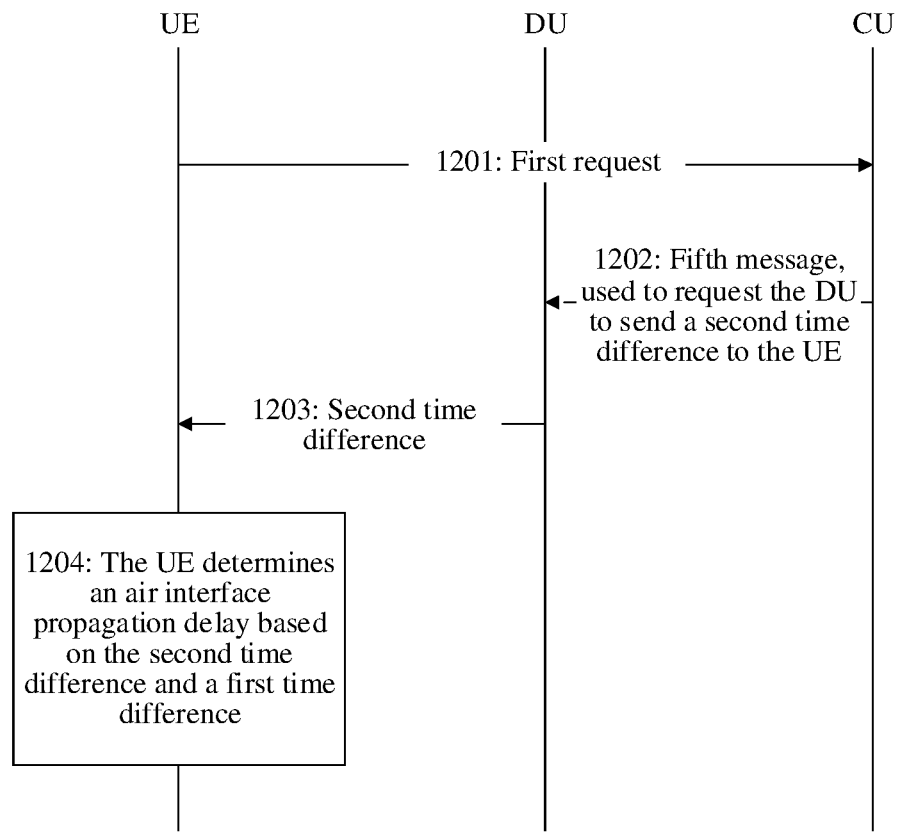
FIG. 12 is a flowchart of a communication method according to Embodiment 4 of this application.

As shown in FIG. 12, an example in which the first communication apparatus is a DU, the second communication apparatus is a CU, and the terminal device is UE is used to provide a procedure of a communication method, which includes at least the following steps.

Step 1201: UE sends a first request to a CU, where the first request is used to request a second time difference. For step 1201, refer to the record in step 1101.

Step 1202: The CU sends a fifth message to a DU, where the fifth message is used to request the DU to send the second time difference to the UE. Similar to the foregoing description, the fifth message may also be replaced with the following: whether the UE supports receiving the second time difference, whether the UE expects to receive the second time difference, or the like.

Optionally, the fifth message may be, but is not limited to, a reference time information reporting control message, a downlink RRC message transfer message, a UE context setup request message, a UE context modification request message, or the like.

The fifth message is used to request the DU to send the second time difference to the UE, and the fifth message further includes: the fifth message indicates the DU to send the second time difference to the UE when receiving the fifth message; or the fifth message includes a third periodicity, where the third periodicity is a periodicity in which the DU sends the second time difference to the UE.

Step 1203: The DU sends the second time difference to the UE based on the fifth message. Optionally, the second time difference may be carried in DCI or MAC layer signaling.

Figure 13:
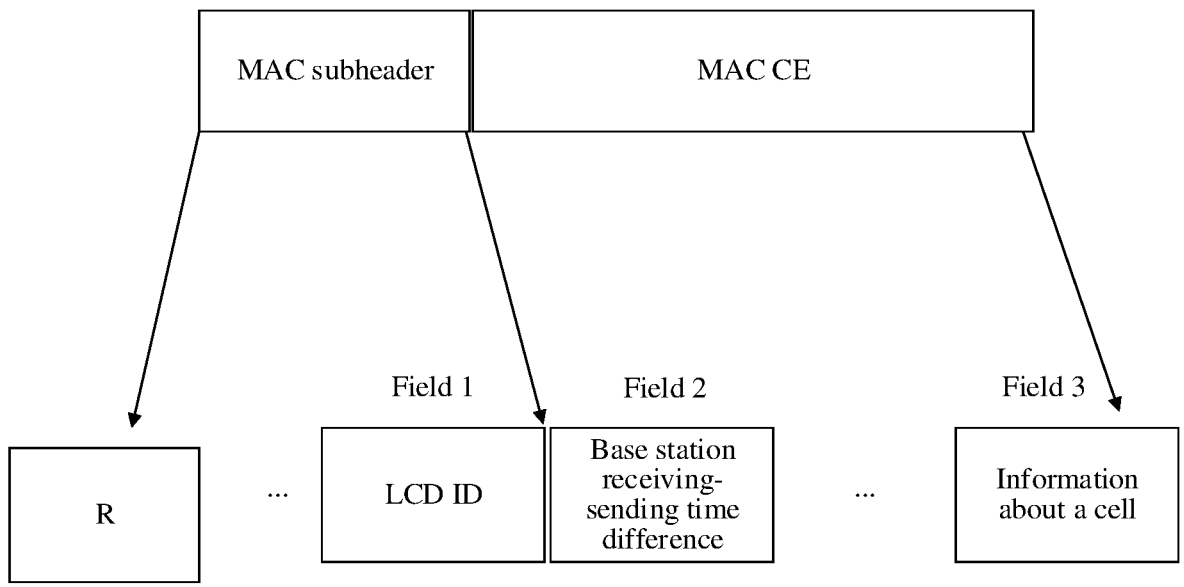
FIG. 13 is a schematic diagram of a MAC layer message according to an embodiment of this application.

Using the MAC layer signaling as an example, as shown in FIG. 13, the MAC layer signaling includes a MAC subheader, a MAC control element (CE), and the like. The MAC subheader includes a field 1 that carries a logical channel identity (LCH ID), which indicates a type of the MAC CE associated with the MAC subheader. The MAC CE carries information indicating the second time difference. For example, the MAC CE includes a field 2 that carries information indicating the second time difference. Optionally, the MAC CE may further include a field 3 that carries information indicating a cell corresponding to the second time difference.

Optionally, the DU may determine a difference between a current second time difference and a second time difference sent last time. If the difference is less than a predefined threshold, the DU no longer sends the second time difference to the UE. In this way, the DU can be prevented from frequently sending the second time difference to the UE, thereby reducing signaling overheads.

Step 1204: The UE determines an air interface propagation delay based on the second time difference and a first time difference. Optionally, the UE may compensate for DU side timing information by using the air interface propagation delay.

According to the foregoing method, when the CU receives the request for the second time difference, the CU directly triggers the DU to send the second time difference to the UE, and the second time difference does not need to be forwarded by the CU, thereby reducing signaling overheads.

Optionally, in a solution, the UE may directly request the second time difference from the DU. When receiving the request, the DU directly sends the second time difference to the UE. In this way, the CU does not need to participate in the entire process, and signaling overheads are lower. In this solution, step 1201 to step 1203 may be replaced with the following: UE sends a second request to a DU. The second request is used to request a second time difference. The DU sends the second time difference to the UE. The second request may be MAC layer signaling, physical layer signaling, or the like. The second request is similar to the first request in step 1101, and a mutual reference may be made. Details are not described again.

The foregoing mainly describes the solutions provided in embodiments of this application from a perspective of the device interaction. It may be understood that, to implement the foregoing functions, the CU or the DU may include corresponding hardware structures and/or software modules for executing the functions. A person skilled in the art should be easily aware that, in embodiments of this application, the units and algorithm steps in the examples described with reference to embodiments disclosed in this specification can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 14:
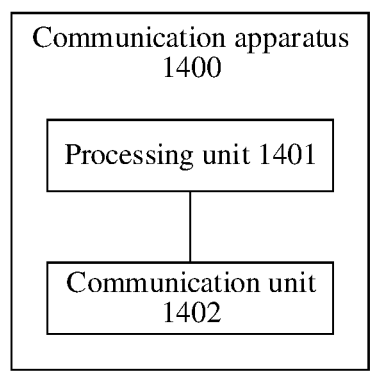
FIG. 14 and FIG. 15 are schematic diagrams of structures of apparatuses according to embodiments of this application.
Figure 15:
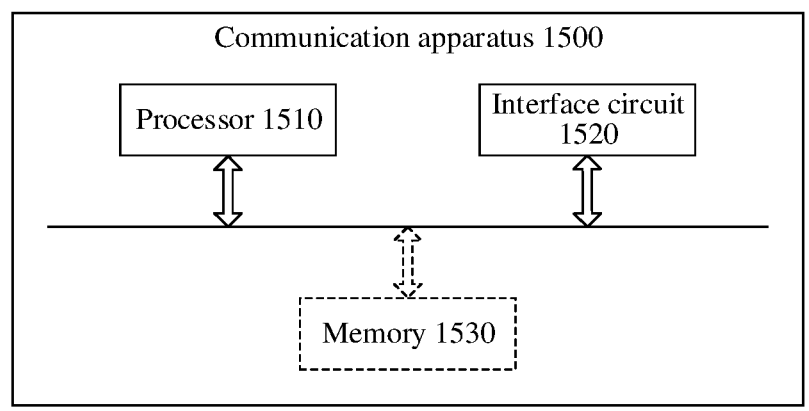

FIG. 14 and FIG. 15 are schematic diagrams of structures of possible communication apparatuses according to embodiments of this application. The communication apparatuses may be configured to implement functions of the CU or the DU in the foregoing method embodiments. In this embodiment of this application, the communication apparatus may be the CU or the DU in the foregoing method embodiments, or may be a module (for example, a chip) used in the CU or the DU, or the like.

As shown in FIG. 14, an apparatus 1400 includes a processing unit 1401 and a communication unit 1402. The communication apparatus 1400 is configured to implement functions of the CU or the DU in the method embodiments shown in FIG. 7 to FIG. 12.

When the communication apparatus 1400 is configured to implement the functions of the DU in the method embodiment shown in FIG. 7 or FIG. 8, the communication unit 1402 is configured to receive a first time difference from a second communication apparatus. The first time difference is a time difference between receiving a first downlink time unit and sending a first uplink time unit by a terminal device. The processing unit 1401 is configured to determine a round trip time RTT based on the first time difference and a second time difference. The second time difference is a time difference between receiving the first uplink time unit and sending the first downlink time unit by the first communication apparatus. The communication unit 1402 is further configured to send a second message to the terminal device. The second message includes the RTT, an air interface propagation delay, or terminal device side timing information, a value of the air interface propagation delay is equal to half of a value of the RTT, and the terminal device side timing information is determined based on the air interface propagation delay.

When the communication apparatus 1400 is configured to implement the functions of the CU in the method embodiment shown in FIG. 7 or FIG. 8, the communication unit 1402 is configured to receive a first time difference from a terminal device. The first time difference is a time difference between receiving a first downlink time unit and sending a first uplink time unit by the terminal device. The communication unit 1402 is further configured to send the first time difference to a first communication apparatus. The first time difference is used by the first communication apparatus to determine a second message. The second message includes a round trip time RTT, an air interface propagation delay, or terminal device side timing information, a value of the air interface propagation delay is equal to half of a value of the RTT, and the terminal device side timing information is determined based on the air interface propagation delay.

When the communication apparatus 1400 is configured to implement the functions of the CU in the method embodiment shown in FIG. 9 or FIG. 10, the communication unit 1402 is configured to receive a first time difference from a terminal device. The first time difference is a time difference between receiving a first downlink time unit and sending a first uplink time unit by the terminal device. The communication unit 1402 is further configured to receive a second time difference from a first communication apparatus. The second time difference is a time difference between receiving the first uplink time unit and sending the first downlink time unit by the first communication apparatus. The processing unit 1401 is configured to determine a round trip time RTT based on the first time difference and the second time difference. The communication unit 1402 is further configured to send a fourth message to the terminal device. The fourth message includes the RTT, an air interface propagation delay, or terminal device side timing information, the terminal device side timing information is determined based on the air interface propagation delay, and a value of the air interface propagation delay is equal to half of a value of the RTT.

When the communication apparatus 1400 is configured to implement the functions of the DU in the method embodiment shown in FIG. 9 or FIG. 10, the processing unit 1401 is configured to determine a second time difference. The second time difference is a time difference between receiving a first uplink time unit and sending a first downlink time unit by a first communication apparatus. The communication unit 1402 is configured to send the second time difference to a second communication apparatus.

When the communication apparatus 1400 is configured to implement the functions of the CU in the method embodiment shown in FIG. 11, the communication unit 1402 is configured to receive a second time difference from a first communication apparatus. The second time difference is a time difference between receiving a first uplink time unit and sending a first downlink time unit by the first communication apparatus. The communication unit 1402 is further configured to send the second time difference to a terminal device. The second time difference is used by the terminal device to determine an air interface propagation delay.

When the communication apparatus 1400 is configured to implement the functions of the DU in the method embodiment shown in FIG. 11, the processing unit 1401 is configured to determine a second time difference. The second time difference is a time difference between receiving a first uplink time unit and sending a first downlink time unit by a first communication apparatus. The communication unit 1402 is configured to send the second time difference to a second communication apparatus.

When the communication apparatus 1400 is configured to implement the functions of the CU in the method embodiment shown in FIG. 12, the communication unit 1402 is configured to receive a first request from a terminal device. The first request is used to request a second time difference between receiving a first uplink time unit and sending a first downlink time unit by a first communication apparatus. The communication unit 1402 is further configured to send a fifth message to the first communication apparatus. The fifth message is used to request the first communication apparatus to send the second time difference to the terminal device.

When the communication apparatus 1400 is configured to implement the functions of the DU in the method embodiment shown in FIG. 12, the communication unit 1402 is configured to receive a fifth message from a second communication apparatus. The fifth message is used to request a first communication apparatus to send a second time difference to a terminal device. The second time difference is a time difference between receiving a first uplink time unit and sending a first downlink time unit by the first communication apparatus. The communication unit 1402 is further configured to send the second time difference to the terminal device. The second time difference is for determining an air interface propagation delay.

For more detailed descriptions of the processing unit 1401 and the communication unit 1402, refer to the description in the method embodiments shown in FIG. 7 to FIG. 12. Details are not described again.

As shown in FIG. 15, a communication apparatus 1500 includes a processor 1510 and an interface circuit 1520. The processor 1510 and the interface circuit 1520 are coupled to each other. It may be understood that the interface circuit 1520 may be a transceiver or an input/output interface. Optionally, the communication apparatus 1500 may further include a memory 1530, configured to store instructions executed by the processor 1510, or store input data required by the processor 1510 to run the instructions, or store data generated after the processor 1510 runs the instructions.

When the communication apparatus 1500 is configured to implement the methods shown in FIG. 7 to FIG. 12, the processor 1510 is configured to implement functions of the processing unit 1401, and the interface circuit 1520 is configured to implement functions of the communication unit 1402.

When the foregoing communication apparatus is a chip used in a CU, the CU chip implements functions of the CU in the foregoing method embodiments. The CU chip receives information from another module (for example, a radio frequency module or an antenna) in the CU, where the information is sent by a DU or a terminal device to the CU; or the CU chip sends information to another module (for example, a radio frequency module or an antenna) in the CU, where the information is sent by the CU to a DU or a terminal device.

When the communication apparatus is a chip used in a DU, the DU chip implements functions of the DU in the foregoing method embodiments. The DU chip receives information from another module (for example, a radio frequency module or an antenna) in the DU, where the information is sent by a CU or a terminal device to the DU; or the DU chip sends information to another module (for example, a radio frequency module or an antenna) in the DU, where the information is sent by the DU to a CU or a terminal device.

It may be understood that, the processor in embodiments of this application may be a central processing unit (CPU), or may be another general-purpose processor, a digital signal processor (DSP), an application-specific integrated circuit (ASIC), a field programmable gate array (FPGA) or another programmable logic device, a transistor logic device, a hardware component, or any combination thereof. The general purpose processor may be a microprocessor or any regular processor or the like.

The processor in embodiments of this application may be a random access memory (RAM), a flash memory, a read-only memory (ROM), a programmable read-only memory (PROM), an erasable programmable read-only memory (EPROM), an electrically erasable programmable read-only memory (EEPROM), a register, a hard disk, a removable hard disk, a CD-ROM, or any other form of storage medium well-known in the art. For example, a storage medium is coupled to a processor, so that the processor can read information from the storage medium and write information into the storage medium. Certainly, the storage medium may be a component of the processor. The processor and the storage medium may be disposed in an ASIC. In addition, the ASIC may be located in a CU, a DU, or a terminal device. Certainly, the processor and the storage medium may alternatively exist in the CU, the DU, or the terminal device as discrete components.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer programs and instructions. When the computer programs or instructions are loaded and executed on a computer, all or some of the procedures or functions in embodiments of this application are executed. The computer may be a general-purpose computer, a dedicated computer, a computer network, a network device, a terminal device, or another programmable apparatus. The computer programs or the instructions may be stored in a computer-readable storage medium, or may be transmitted through the computer-readable storage medium. The computer-readable storage medium may be any usable medium accessible by a computer, or a data storage device such as a server integrating one or more usable media. The usable medium may be a magnetic medium, for example, a floppy disk, a hard disk drive, or a magnetic tape; or may be an optical medium, for example, a DVD; or may be a semiconductor medium, for example, a solid state disk (SSD).

In embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

It may be understood that various numbers in embodiments of this application are merely used for differentiation for ease of description, and are not used to limit the scope of embodiments of this application. Sequence numbers of the foregoing processes do not mean execution sequences. The execution sequences of the processes should be determined based on functions and internal logic of the processes.

What is claimed is:

1. A second communication apparatus, wherein the second communication apparatus is a central unit (CU) or a chip in the CU, and the second communication apparatus comprises:
a processor, and a memory coupled to the processor with program code stored thereon, wherein when the program code is run on the processor, the second communication apparatus is configured to:
receive a first time difference from a terminal device, wherein the first time difference is a time difference between receiving a first downlink time unit and sending a first uplink time unit by the terminal device;

receive a second time difference from a first communication apparatus, wherein the second time difference is a time difference between receiving the first uplink time unit and sending the first downlink time unit by the first communication apparatus;

determine a round trip time (RTT) based on the first time difference and the second time difference; and send a first message to the terminal device, wherein the first message comprises the RTT, an air interface propagation delay, or terminal device side timing information, the terminal device side timing information is determined based on the air interface propagation delay, and a value of the air interface propagation delay is equal to half of a value of the RTT.

2. The second communication apparatus according to claim 1, wherein when the program code is run on the processor, the second communication apparatus is further configured to:

send first indication information to the terminal device, wherein the first indication information is configured to cause the terminal device to report the first time difference.

3. The second communication apparatus according to claim 2, wherein the first indication information comprises:

a periodicity in which the terminal device reports the first time difference to the second communication apparatus; or a trigger event for which the terminal device reports the first time difference to the second communication apparatus.

4. The second communication apparatus according to claim 3, wherein the first indication information further comprises:

information about a cell corresponding to the first time difference reported by the terminal device.

5. The second communication apparatus according to claim 3, wherein the trigger event comprises at least one of the following:

a variation between a currently measured first time difference measured by the terminal device and a last reported first time difference being greater than or equal to a first threshold; or the currently measured first time difference being greater than or equal to a second threshold.

6. The second communication apparatus according to claim 1, wherein, when the program code is run on the processor, the second communication apparatus is further configured to:

receive from the terminal device, information about a cell corresponding to the first time difference.

7. The second communication apparatus according to claim 1, wherein, when the program code is run on the processor, the second communication apparatus is further configured to:

send a second message requesting the second time difference to the first communication apparatus.

8. The second communication apparatus according to claim 7, wherein the second message comprises:

a message configured to cause the first communication apparatus to send the second time difference to the second communication apparatus when receiving the second message; or a second periodicity, wherein the second periodicity is a periodicity in which the first communication apparatus sends the second time difference to the second communication apparatus.

9. A first communication apparatus, wherein the first communication apparatus is a distributed unit (DU) or a chip in the DU, and the first communication apparatus comprises:

a processor, and a memory coupled to the processor with program code stored thereon, wherein when the program code is run on the processor, the first communication apparatus is configured to:

determine a time difference, wherein the time difference is a time difference between the first communication apparatus receiving a first uplink time unit and the first communication apparatus sending a first downlink time unit, wherein the first uplink time unit is a radio frame, a subframe, a slot, a mini-slot, or a symbol received by the first communication apparatus from a terminal device, and the first downlink time unit is a radio frame, a subframe, a slot, a mini-slot, or a symbol transmitted by the first communication apparatus to the terminal device; and send the time difference to a second communication apparatus.

10. The first communication apparatus according to claim 9, wherein, when the program code is run on the processor, the first communication apparatus is further configured to:

receive a message requesting the time difference from the second communication apparatus.

11. The first communication apparatus according to claim 10, wherein the message is configured to cause the first communication apparatus to send the time difference to the second communication apparatus in response to receiving the message.

12. The first communication apparatus according to claim 10, wherein the message comprises a second periodicity, wherein the second periodicity is a periodicity in which the first communication apparatus sends the time difference to the second communication apparatus.

13. The first communication apparatus according to claim 9, wherein sending the time difference to the second communication apparatus includes sending the time difference to the terminal device via the second communication apparatus.

14. The first communication apparatus according to claim 13, wherein the time difference is configured to be used by the terminal device to determine an air interface propagation delay.

15. A second communication apparatus, wherein the second communication apparatus is a central unit (CU) or a chip in the CU, and the second communication apparatus comprises:

a processor and a memory coupled to the processor with program code stored thereon, wherein when the program code is run on the processor, the second communication apparatus is configured to:

receive a time difference from a first communication apparatus, wherein the time difference is a time difference between receiving a first uplink time unit and sending a first downlink time unit by the first communication apparatus, wherein the first uplink time unit is a radio frame, a subframe, a slot, a mini-slot, or a symbol received by the first communication apparatus from a terminal device, and the first downlink time unit is a radio frame, a subframe, a slot, a mini-slot, or a symbol transmitted by the first communication apparatus to the terminal device; and send the time difference to the terminal device, wherein the time difference is configured to be used by the terminal device to determine an air interface propagation delay.

16. The second communication apparatus according to claim 15, wherein when the program code is run on the processor, the second communication apparatus is further configured to:
   before the receiving the time difference from the first communication apparatus, receive a first request requesting the time difference from the terminal device.

17. The second communication apparatus according to claim 16, wherein the first request comprises information about a cell corresponding to the time difference.

18. The second communication apparatus according to claim 15, wherein, when the program code is run on the processor, the second communication apparatus is further configured to:
   before the receiving the time difference from the first communication apparatus, send a message requesting the time difference to the first communication apparatus.

19. The second communication apparatus according to claim 18, wherein the message is configured to cause the first communication apparatus to send the time difference to the second communication apparatus when receiving the message; or
   the message comprises a third periodicity, wherein the third periodicity is a periodicity in which the first communication apparatus sends the time difference to the second communication apparatus.

20. The second communication apparatus according to claim 15, wherein, when the program code is run on the processor, the second communication apparatus is further configured to:
   send information about a cell corresponding to the time difference to the terminal device.

* * * * *